US012801603B2

(12) United States Patent
Penumarti

(10) Patent No.: US 12,801,603 B2
(45) Date of Patent: Nov. 17, 2026

(54) STRUCTURED DATABASE MAPPING FOR DYNAMIC STRUCTURED QUERY LANGUAGE (SQL) GENERATION

(71) Applicant: SAS Institute Inc., Cary, NC (US)

(72) Inventor: Veera babu Penumarti, Apex, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 18/960,807

(22) Filed: Nov. 26, 2024

(65) Prior Publication Data

US 2026/0017259 A1 Jan. 15, 2026

Related U.S. Application Data

(60) Provisional application No. 63/670,715, filed on Jul. 12, 2024.

(51) Int. Cl.
*G06F 16/2453* (2019.01)

(52) U.S. Cl.
CPC .. *G06F 16/24537* (2019.01); *G06F 16/24539* (2019.01)

(58) Field of Classification Search
CPC ..................... G06F 16/24537; G06F 16/24539
See application file for complete search history.

(56) References Cited

U.S. PATENT DOCUMENTS

| | | | |
|---|---|---|---|
| 7,908,266 B2 | 3/2011 | Zeringue et al. | |
| 8,645,386 B2 | 2/2014 | Hess et al. | |
| 9,268,828 B2 | 2/2016 | Rausch et al. | |
| 9,569,263 B2 | 2/2017 | Rausch et al. | |
| 11,341,414 B2 | 5/2022 | Rausch et al. | |
| 2011/0208663 A1* | 8/2011 | Kennis | G06Q 30/018 705/317 |
| 2019/0228014 A1* | 7/2019 | Liu | G06F 16/2456 |
| 2021/0249002 A1* | 8/2021 | Ahmadidaneshashtiani | G06F 40/284 |
| 2022/0358336 A1* | 11/2022 | Abolhasssani | G06N 5/01 |
| 2024/0256541 A1* | 8/2024 | Gladwin | G06F 16/22 |
| 2024/0265014 A1* | 8/2024 | Agrawal | G06F 16/221 |
| 2024/0362278 A1* | 10/2024 | PerezLeon | G06F 40/40 |

OTHER PUBLICATIONS

Shi et al., "A Survey on Employing Large Language Models for Text-to-SQL Task," Conference acronym 'XX, Jun. 3-5, 2018, Woodstock, NY.

* cited by examiner

*Primary Examiner* — Aleksandr Kerzhner
*Assistant Examiner* — Aryan D Toughiry
(74) *Attorney, Agent, or Firm* — Dority & Manning, P.A.

(57) ABSTRACT

A mapping file for a relational database comprising a plurality of tables is accessed. The tables comprise a plurality of data elements. The mapping file comprises predefined join operations that each define a join between two of the tables and a corresponding join type. The mapping file further includes classification information that associates the data elements with element classes. A selection of target data elements is received, the target data elements being associated with a common element class and from at least two different tables. A minimum set of join operations necessary to retrieve the target data elements is dynamically selected from the mapping file in response to receiving the selection. A unit of software instructions is generated and executed to retrieve the target data elements and a structured data object comprising the target data elements is output.

32 Claims, 22 Drawing Sheets

FIG. 14

STRUCTURED DATABASE MAPPING FOR DYNAMIC STRUCTURED QUERY LANGUAGE (SQL) GENERATION

PRIORITY CLAIM

This application claims the benefit of, and priority based on, 35 U.S.C. § 119 to U.S. Provisional Application No. 63/670,715, filed Jul. 12, 2024, which is incorporated herein by reference in its entirety.

BACKGROUND

Relational databases are structured data storage systems. Relational databases generally organize information into tables, where data is arranged in rows and columns. Most relational databases are structured such that each table represents a specific type of entity, and rows within the table represent individual records of that entity, with columns capturing specific attributes. Relational databases use a formal structure and leverages Structured Query Language (SQL) to define, manipulate, and retrieve data. Relationships between tables are established through keys—these keys can be used to connect data from multiple tables. In other words, keys can establish relationships between data stored to multiple tables within a relational database. This organization allows for efficient querying and complex operations across datasets.

SUMMARY

This summary is not intended to identify only key or essential features of the described subject matter, nor is it intended to be used in isolation to determine the scope of the described subject matter. The subject matter should be understood by reference to appropriate portions of the entire specification of this patent application, any or all drawings, and each claim.

One example implementation of the present disclosure is directed to a computer-program product tangibly embodied in a non-transitory machine-readable storage medium, the computer-program product including instructions operable to cause one or more processor devices to perform operations. The one or more processor devices are to access a mapping file for a relational database, the relational database comprising a plurality of tables, the plurality of tables comprising a plurality of data elements, wherein the mapping file comprises a plurality of predefined join operations that each define a join between two tables of the plurality of tables and a corresponding join type, and wherein the mapping file further comprises classification information that associates each of the plurality of data elements with a corresponding element class of a plurality of element classes. The one or more processor devices are further to receive an input indicative of selection of a plurality of target data elements from the plurality of data elements, the plurality of target data elements comprising two or more target data elements from at least two different tables of the plurality of tables, the two or more target data elements being associated with a common element class of the plurality of element classes. The one or more processor devices are further to dynamically select a set of predefined join operations from the plurality of predefined join operations of the mapping file, wherein the set of predefined join operations are selected dynamically in response to receiving the input indicative of the selection of the plurality of target data elements, and wherein the set of predefined join operations comprises a minimum set of join operations necessary to retrieve the plurality of target data elements. The one or more processor devices are further to generate a unit of software instructions that, when executed, implements the set of predefined join operations. The one or more processor devices are further to execute the unit of software instructions to retrieve the plurality of target data elements. The one or more processor devices are further to output a structured data object comprising the plurality of target data elements.

Another example implementation of the present disclosure is directed to a system including one or more data processors and a non-transitory computer-readable storage medium containing instructions which, when executed on the one or more data processors, cause the one or more data processors to access a mapping file for a relational database, the relational database comprising a plurality of tables, the plurality of tables comprising a plurality of data elements, wherein the mapping file comprises a plurality of predefined join operations that each define a join between two tables of the plurality of tables and a corresponding join type, and wherein the mapping file further comprises classification information that associates each of the plurality of data elements with a corresponding element class of a plurality of element classes. The one or more data processors are further to receive an input indicative of selection of a plurality of target data elements from the plurality of data elements, the plurality of target data elements comprising two or more target data elements from at least two different tables of the plurality of tables, the two or more target data elements being associated with a common element class of the plurality of element classes. The one or more data processors are further to dynamically select a set of predefined join operations from the plurality of predefined join operations of the mapping file, wherein the set of predefined join operations are selected dynamically in response to receiving the input indicative of the selection of the plurality of target data elements, and wherein the set of predefined join operations comprises a minimum set of join operations necessary to retrieve the plurality of target data elements. The one or more data processors are further to generate a unit of software instructions that, when executed, implements the set of predefined join operations. The one or more data processors are further to execute the unit of software instructions to retrieve the plurality of target data elements. The one or more data processors are further to output a structured data object comprising the plurality of target data elements.

Another example implementation of the present disclosure is directed to a computer-implemented method. The method includes accessing, by a computing system comprising one or more computing devices, a mapping file for a relational database, the relational database comprising a plurality of tables, the plurality of tables comprising a plurality of data elements, wherein the mapping file comprises a plurality of predefined join operations that each define a join between two tables of the plurality of tables and a corresponding join type, and wherein the mapping file further comprises classification information that associates each of the plurality of data elements with a corresponding element class of a plurality of element classes. The method further includes receiving, by the computing system, an input indicative of selection of a plurality of target data elements from the plurality of data elements, the plurality of target data elements comprising two or more target data elements from at least two different tables of the plurality of tables, the two or more target data elements being associated with a common element class of the plurality of element classes. The method further includes dynamically selecting, by the computing system, a set of predefined join operations from the plurality of predefined join operations of the mapping file, wherein the set of predefined join operations are selected dynamically in response to receiving the input indicative of the selection of the plurality of target data elements, and wherein the set of predefined join operations comprises a minimum set of join operations necessary to retrieve the plurality of target data elements. The method further includes generating, by the computing system, a unit of software instructions that, when executed, implements the set of predefined join operations. The method further includes executing, by the computing system, the unit of software instructions to retrieve the plurality of target data elements. The method further includes outputting, by the computing system, a structured data object comprising the plurality of target data elements.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
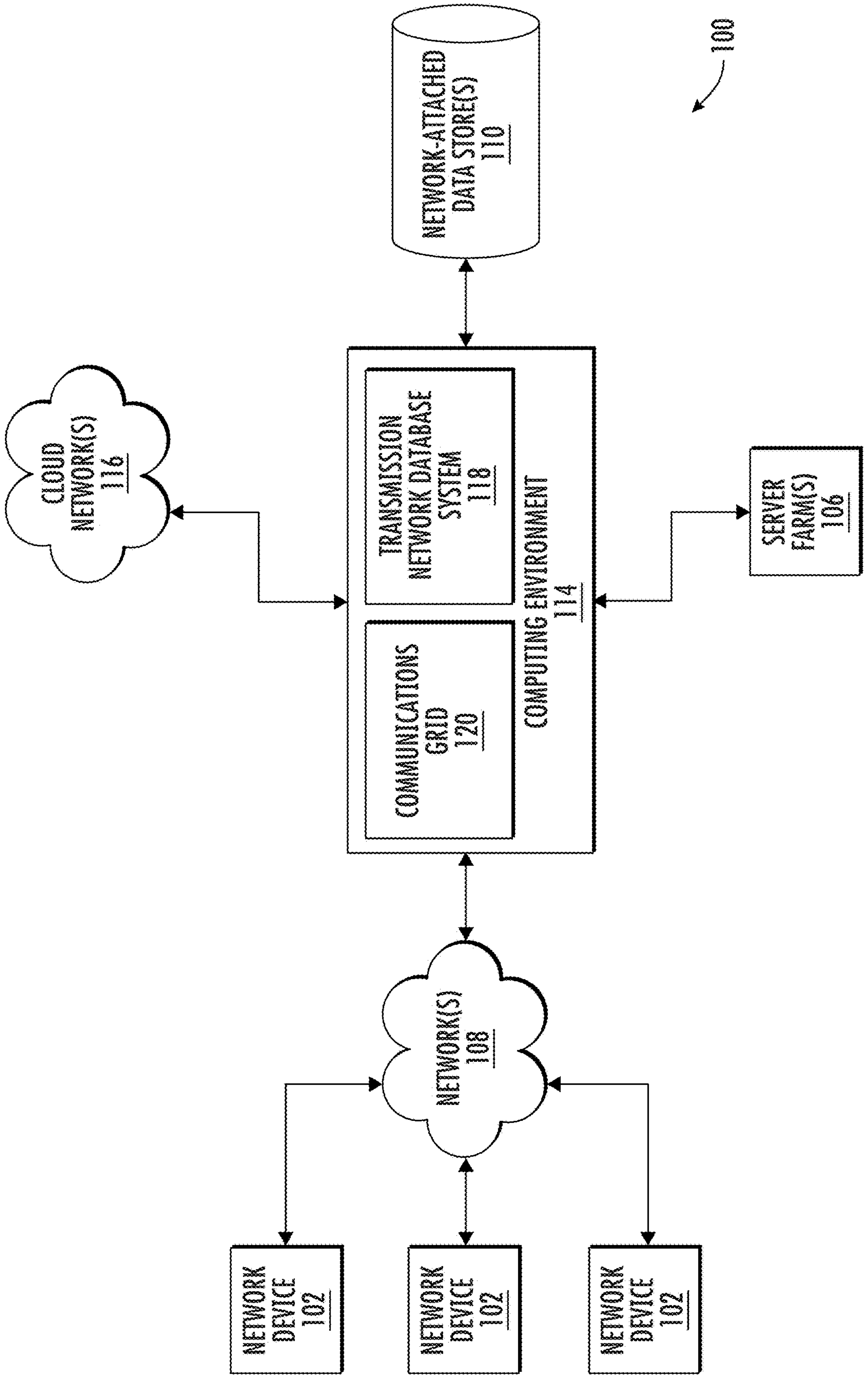
FIG. 1 illustrates a block diagram that provides an illustration of the hardware components of a computing system, according to some embodiments of the present technology.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples and claims are not limited to any particular sequence or order of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context. The use of "and/or" between a phrase A and a phrase B, such as "A and/or B" means A alone, B alone, or A and B together.

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional operations not included in a figure. A process may correspond to a method, a function, a procedure, a subroutine, a subprogram, etc. When a process corresponds to a function, its termination can correspond to a return of the function to the calling function or the main function.

Relational databases are structured data storage systems that put information into tables, which usually include information of a specific type (e.g., product manufacturing information, sensor readings, etc.). Table rows generally contain information related to a specific entity (e.g., a person, business, organization, group, transaction, product, location, device, etc.). The columns of the table, also referred to herein as "data elements," can each correspond to specific attributes of the entity. For example, assume that a table in a relational database called "products" stores manufacturing information for a variety of products manufactured by a certain organization. Each row of the table may correspond to a specific product and can include a product ID that uniquely identifies each product. Each column, or "data element," may correspond to a particular attribute of the specific product (e.g., manufacturing cost, materials required, etc.).

Relationships between tables in a relational database are established through keys, which connect data from multiple tables. More specifically, each table can include a "primary key" that provides a unique identifier to each row of the table (e.g., a unique product ID for a product table, a unique employee ID for each employee record, etc.). A "foreign key" is a field in one table that refers to the primary key of another table. Existing relationships between tables can be manipulated to retrieve desired information from a relational database via the use of Structured Query Language (SQL). SQL is used to create queries for a relational database. A "join" refers to operations that are used to combine data from multiple tables based on related columns. Join operations use primary keys and foreign keys to link rows logically across tables. Various types of joins, such as inner joins, outer joins (left, right, and full), and cross joins, can be used to retrieve information from related tables.

There are a number of inefficiencies associated with relational databases. For example, a relational database user must have a strong knowledge of SQL syntax and experience using such syntax to retrieve information. Knowledge of (and experience using) SQL syntax is relatively rare, and is typically possessed by software engineers, data scientists, or other technical experts in the field of information technology. In turn, this limits the usability of relational databases to a small subset of users. Furthermore, a relational database user must also possess a deep knowledge of the existing information stored to the relational database and the specific structure of the relational database (e.g., table names, columns included in each table, how existing tables are related, etc.). This requirement can further limit the usability of relational databases. As such, an approach to reduce these inefficiencies and therefore improve existing relational databases is greatly desired.

Accordingly, implementations described herein propose structured database mapping for dynamic SQL generation. More specifically, a computing system can access a mapping file for a relational database. The relational database can include a variety of different tables. Each of these tables can include various rows and columns (hereinafter referred to as "data elements"). The mapping file can include a plurality of predefined join operations. Each of the join operations can define a join between two tables of the relational database and a corresponding join type. To follow the above example, given the "products" and "orders" tables, the mapping file can include a predefined join operation that joins the "products" and "orders" tables on a common key or data element (e.g., the "product ID" data element) and can also specify a particular join operation (e.g., left join, inner join, etc.).

The mapping file can further include classification information for the data elements of the relational database. The classification information can associate each of the data elements with a corresponding "element class" of a plurality of element classes. As described herein, an "element class" can refer to any type and/or granularity of classification of attributes represented by data elements of the relational database. To follow the above example, assume that the "orders" table includes an "shipping location" data element that stores the destination location for a particular order. Further assume that the "products" table includes a "manufacturing location" data element that stores the location at which the product is manufactured. Although the "shipping location" data element and the "manufacturing location" data element are not located within the same table, and do not reference each other as keys, the two data elements may still be classified under a "location" element class that is associated with any data element related to physical location information. As such, the classification information can indicate which data elements within the relational database are “conceptually” or “semantically” similar regardless of table location and/or relational status.

The computing system can receive some indication that a plurality of target data elements have been selected from a plurality of data elements. For example, the computing system may receive an input from a user via a user interface to select the plurality of target data elements. The plurality of target data elements can include two or more target data elements from different tables of the relational database. The two or more target data elements can be associated with a common element class by the classification information. To follow the previous example, assume that a user interface is displayed to a user to select target data elements. The user interface can group data elements based on their element class, and as such, data elements from different tables can be assigned to the same group based on a shared element class. The user can select the two or more target data elements from different tables from the same grouping of data elements within the user interface. Alternatively, in some instances, the user can provide a natural language query (e.g., a spoken utterance, a textual input, etc.), and the computing system can process the natural language query to identify the plurality of target data elements.

In response to receiving the selection input, the computing system can dynamically select a set of predefined join operations from a plurality of predefined join operations defined by the mapping file. The set of predefined join operations includes a minimum set of join operations necessary to retrieve the plurality of target data elements. As described herein, the “minimum set of join operations” may refer to a set of join operations that include a minimum possible number of join operations, a set of join operations with a minimum predicted computational cost, a set of join operations with a minimum predicted latency, etc. while being sufficient to retrieve the plurality of target data elements.

The computing system can generate a unit of software instructions that, when executed, implements the set of predefined join operations. For example, the unit of software instructions may be, or include, an SQL query that implements the set of predefined join operations. The computing system can execute the unit of software instructions to retrieve the plurality of target data elements, and then output a structured data object that includes the plurality of target data elements. In this manner, implementations described herein can leverage the mapping file to dynamically select a set of predefined join operations and then generate a unit of software instructions to implement the set of predefined join operations.

Aspects of the present disclosure provide a number of technical effects and benefits. As one example technical effect and benefit, implementations described herein can mitigate existing inefficiencies of relational databases (e.g., restrictive knowledge and experience requirements) and improve the usability of existing relational databases. For example, users who wish to query a relational database using conventional approaches must possess both a deep knowledge of how to use SQL and a deep knowledge of the information stored to the database being queried. Non-expert users (e.g., users without the required knowledge described above) often submit more queries than expert users. Further, the queries submitted by non-expert users generally require orders of magnitude more computing resources to execute than queries from expert users. In conjunction, these inefficiencies can lead to unnecessary usage of computing resources (e.g., power, memory, compute cycles, storage, etc.). However, based on a selection of desired data elements, implementations described herein can dynamically select a set of predefined join operations and generate a unit of software instructions to implement the join operations, thereby enabling the user to retrieve the desired elements without requiring any knowledge of SQL or the relational database itself. By obviating the need for non-expert users to submit queries to relational databases, implementations described herein substantially reduce the usage of computing resources associated with implementing queries from non-expert users.

An additional technical benefit provided by the approach described herein is that the mapping file can be utilized as a loosely-coupled “intermediate” layer that enables new columns, tables, joins, rules, etc. to be added to the relational database without modifying the underlying data model of the relational database (e.g., how tables are structured/related). More specifically, using conventional approaches, new additions to a relational database often necessitate the modification of existing tables that may relate to the new table. For example, if a new table introduces unique product identifiers for specific products, and existing tables use a different type of identifier to identify such products, the existing tables may need to be modified to replace the existing identifier with the unique product identifier. However, implementations described herein obviate the need to modify existing tables by storing associations to the mapping file. In such fashion, implementations described herein can substantially reduce, or eliminate, the need to modify existing files within a relational database.

Example Systems

Systems depicted in some of the figures may be provided in various configurations. In some embodiments, the systems may be configured as a distributed system where one or more components of the system are distributed across one or more networks in a cloud computing system.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
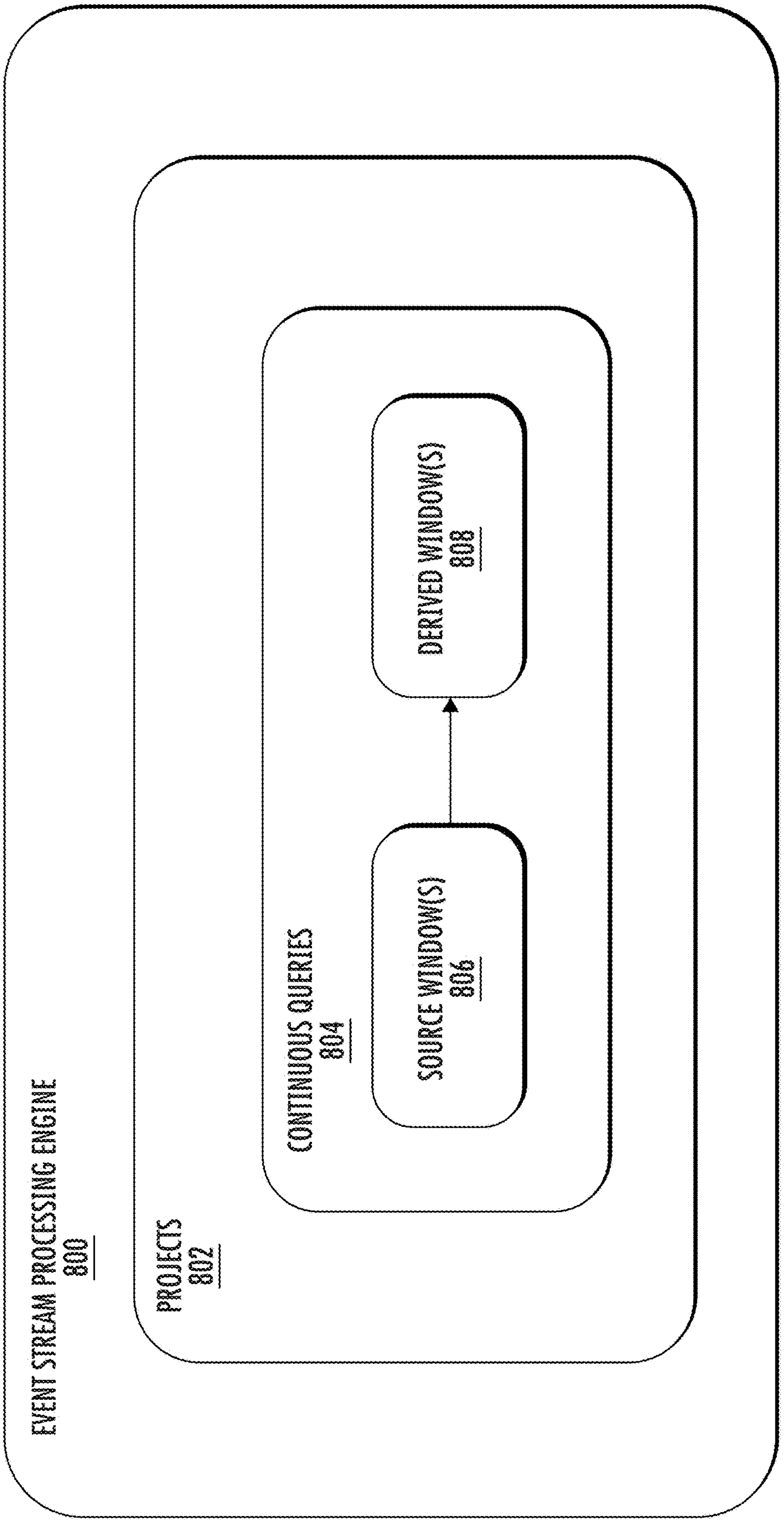
FIG. 8 illustrates a block diagram including components of an Event Stream Processing Engine (ESPE), according to embodiments of the present technology.
Figure 9:
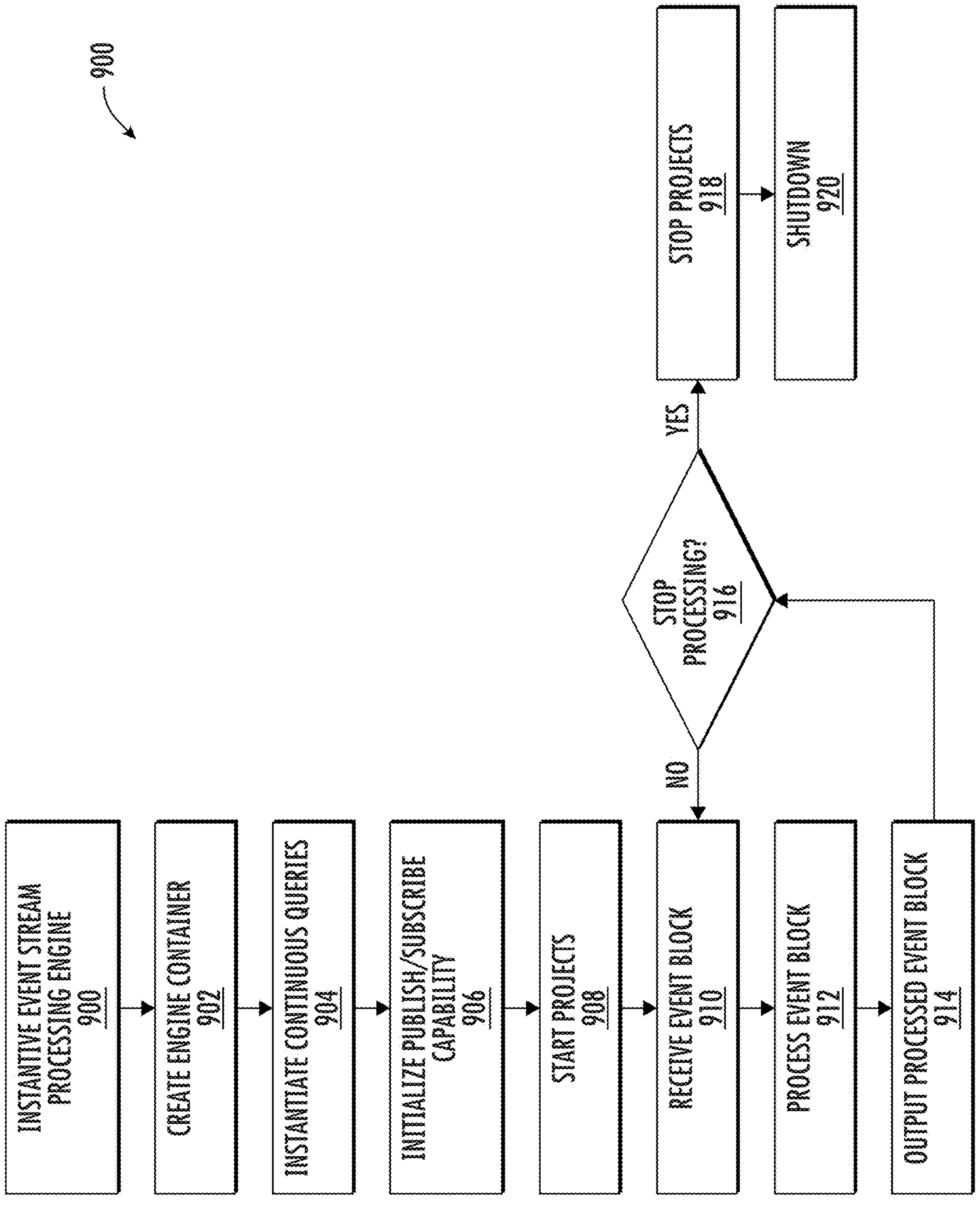
FIG. 9 illustrates a flow chart showing an example process including operations performed by an event stream processing engine, according to some embodiments of the present technology.
Figure 10:
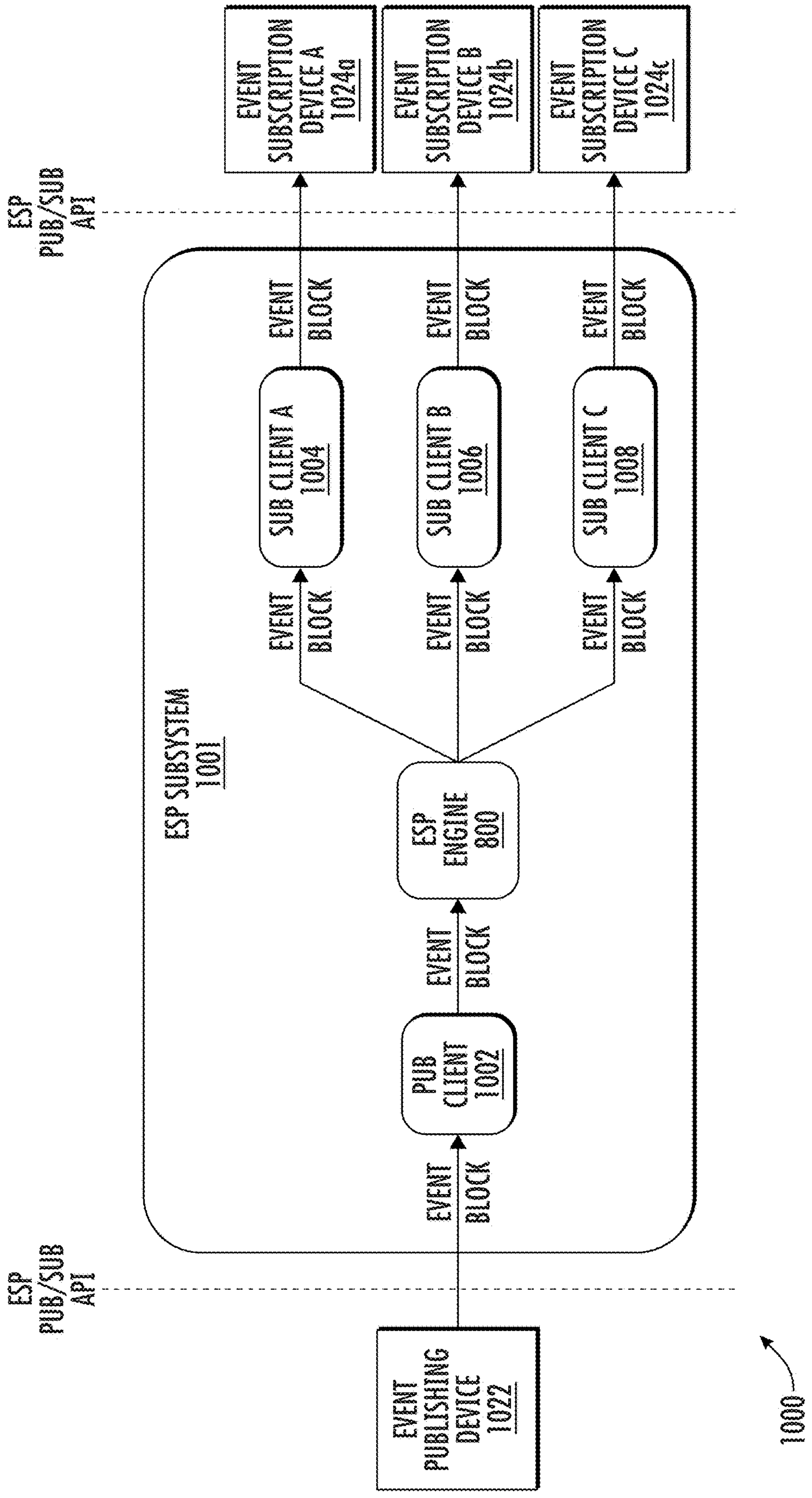
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more server farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the network(s) 108, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
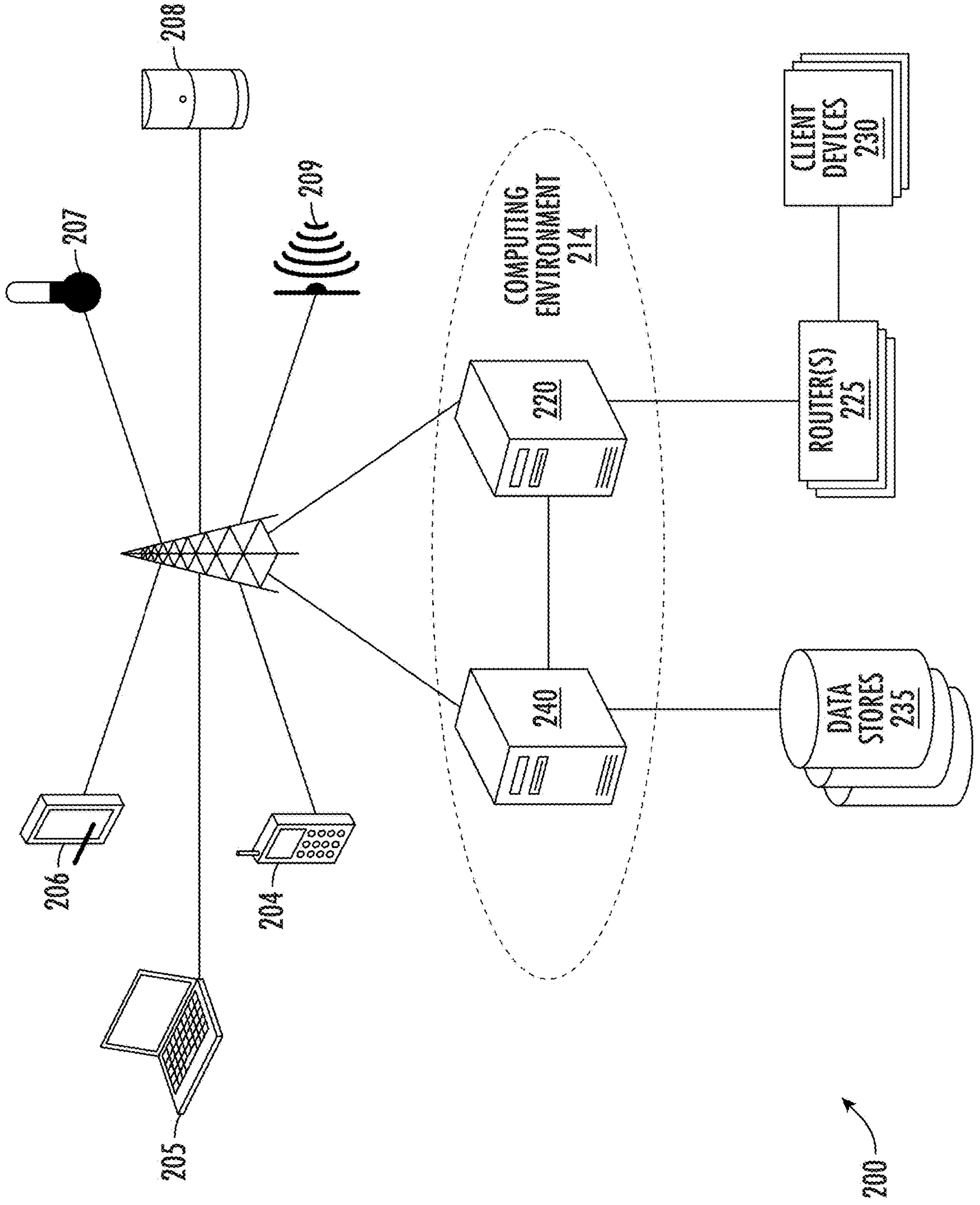
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

In some implementations, device(s) described with regards to FIG. 2 (e.g., sensors, devices that include sensors, devices that receive sensor data, etc.) can locally process or pre-process data prior to transmission.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other internetwork or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
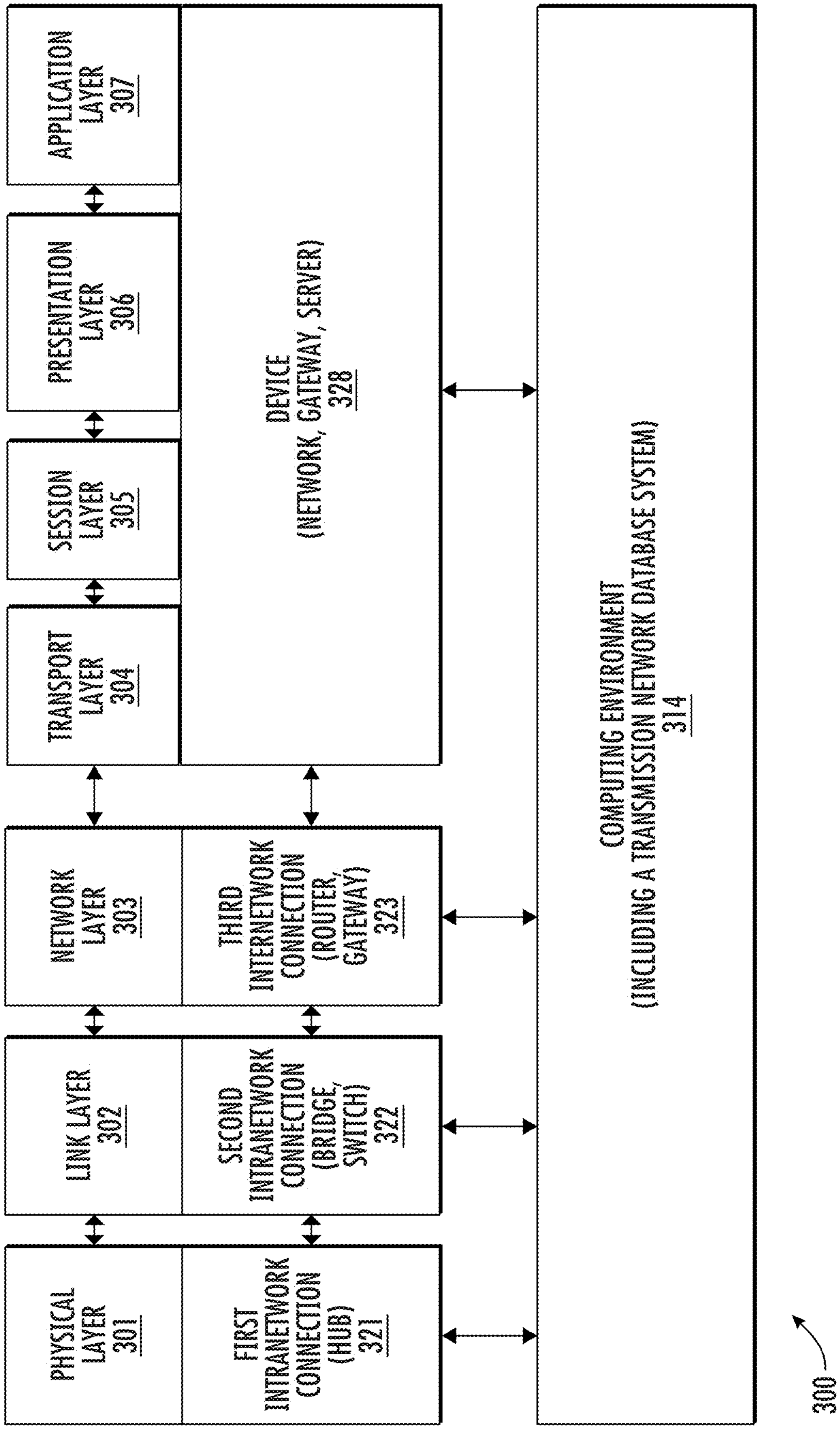
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bytes of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Internetwork connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid. In some implementations, a node can locally process or pre-process a portion of data distributed to the node.

Figure 4:
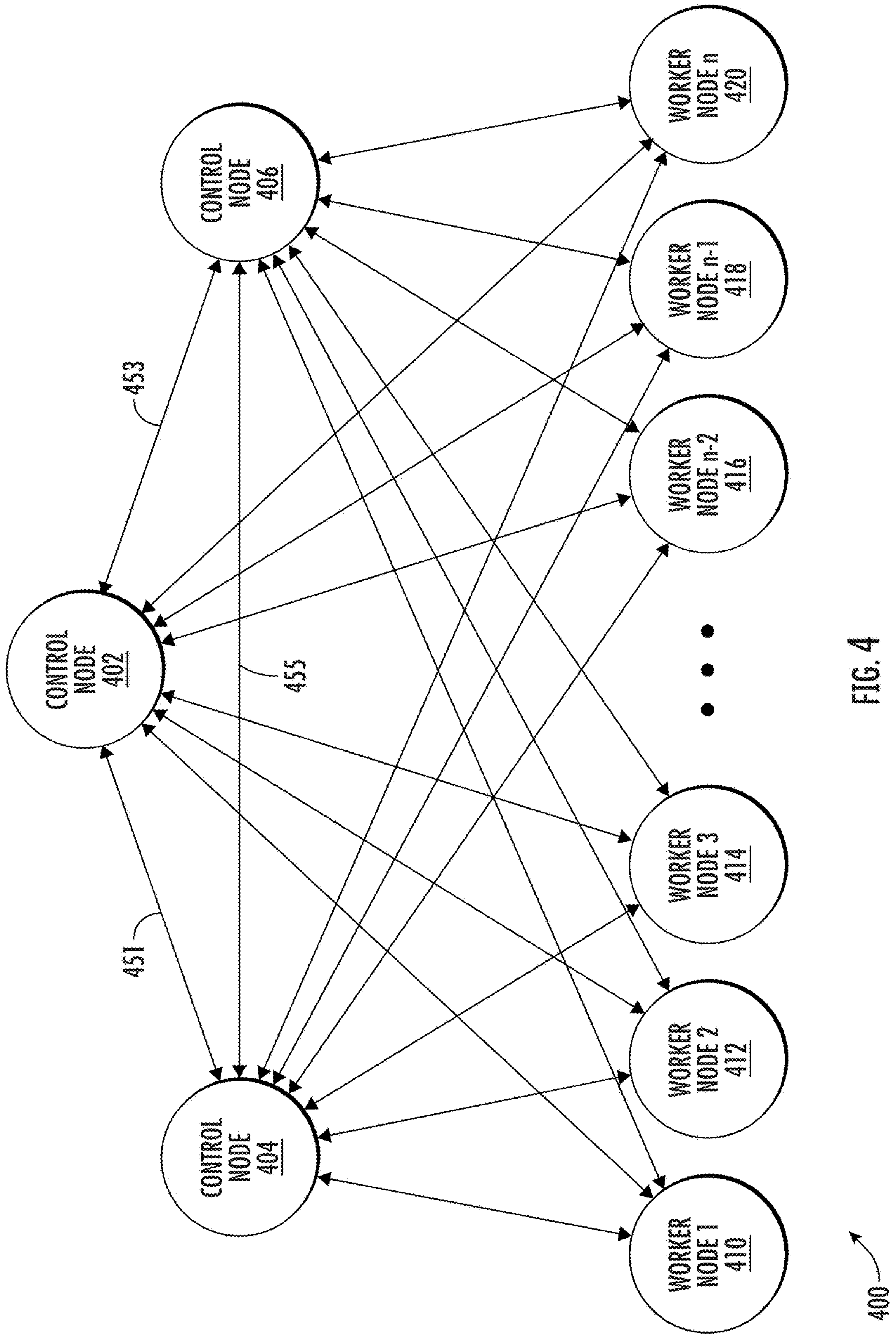
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid computing system 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, and coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project codes running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid computing system 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
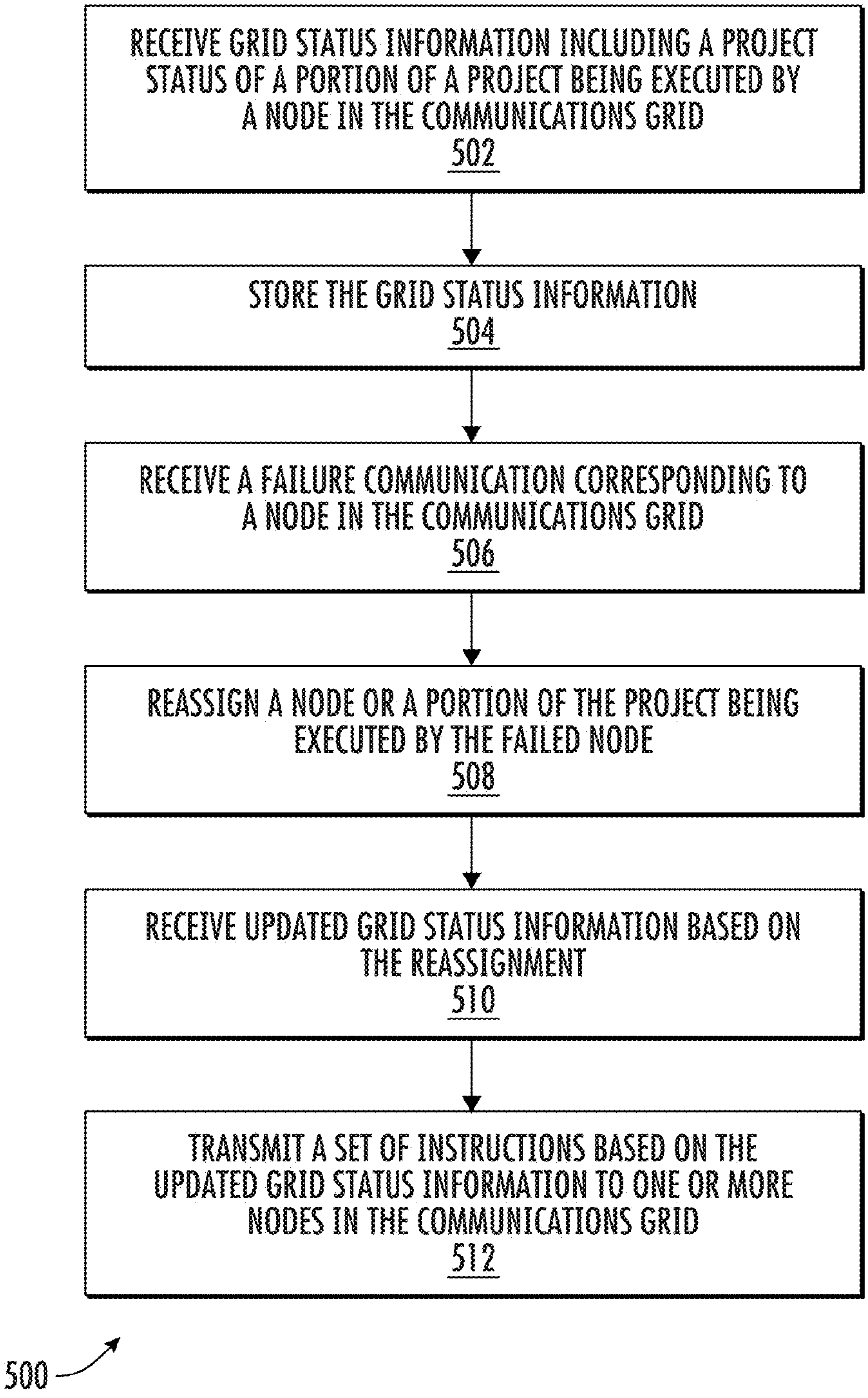
FIG. 5 illustrates a flow chart showing an example process for adjusting a communications grid or a work project in a communications grid after a failure of a node, according to some embodiments of the present technology.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
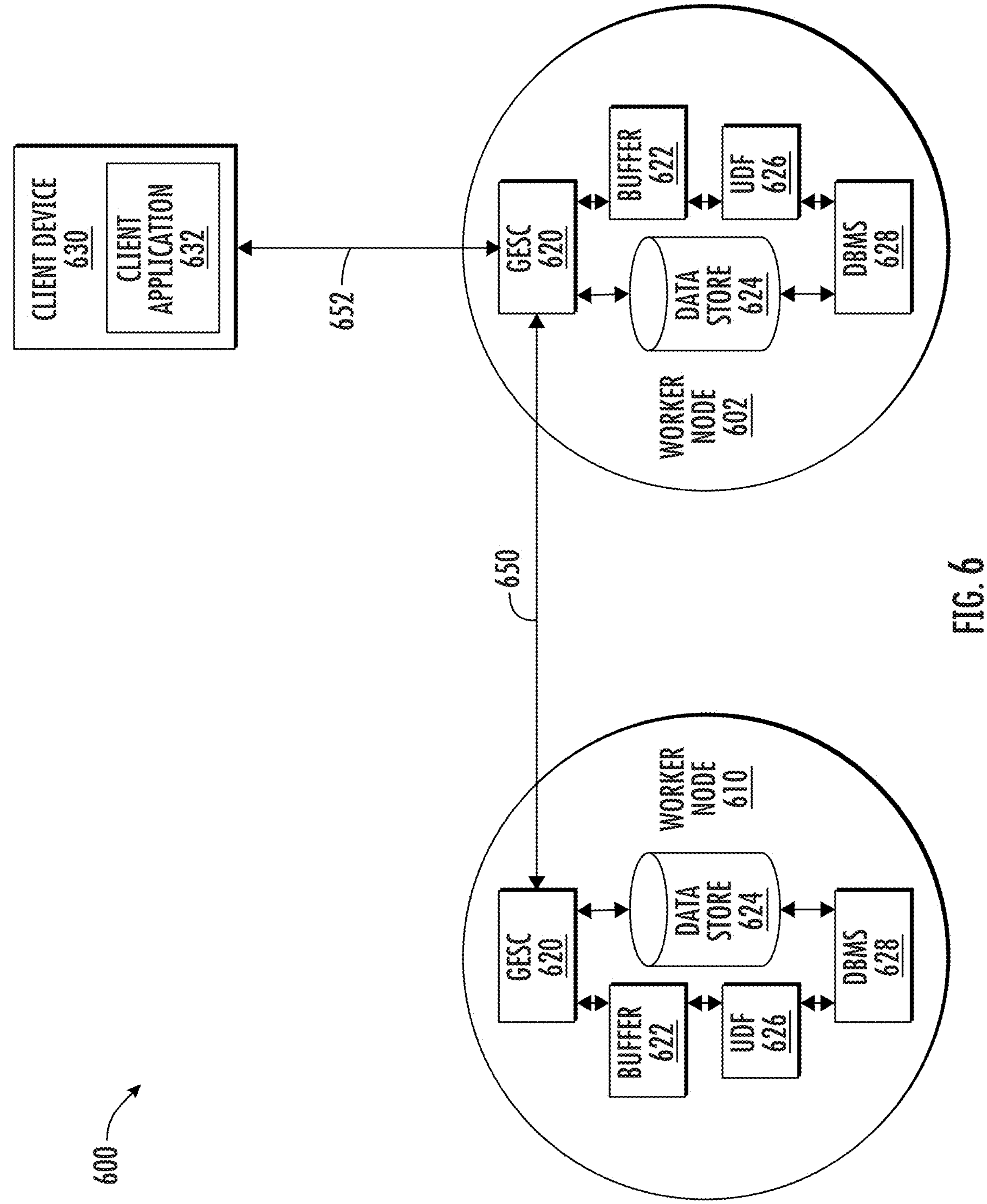
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid computing system 600 includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However, in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 610 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DBMS 628 may control the creation, maintenance, and use of database or data structure (not shown) within nodes 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
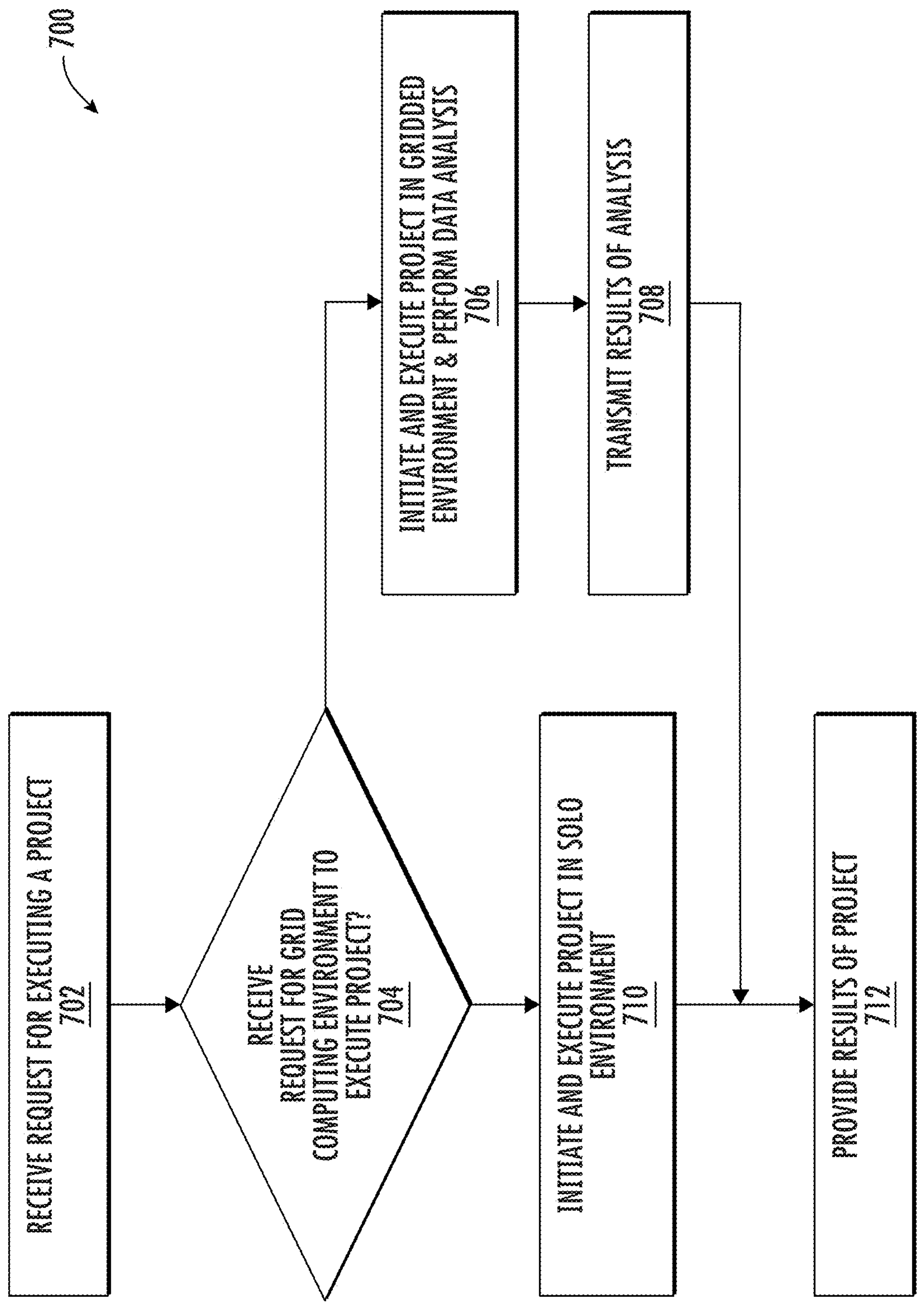
FIG. 7 illustrates a flow chart showing an example process for executing a data analysis or processing project, according to some embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024*a*-*c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

In some implementations, the ESPE can apply a data filtering technique to event streams.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.). ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a-c*, according to embodiments of the present technology. ESP system 1000 may include ESP device or subsystem 851, event publishing device 1022, an event subscribing device A 1024*a*, an event subscribing device B 1024*b*, and an event subscribing device C 1024*c*. Input event streams are output to ESP device 851 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024*a*, event subscribing device B 1024*b*, and event subscribing device C

1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024*a*, event subscribing device B 1024*b*, and event subscribing device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing devices of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024*a* using the publish/subscribe API. Subscribing client B 1006 may be started by an event subscription application B executing at event subscribing device B 1024*b* using the publish/subscribe API. Subscribing client C 1008 may be started by an event subscription application C executing at event subscribing device C 1024*c* using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024*a-c*. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or affected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
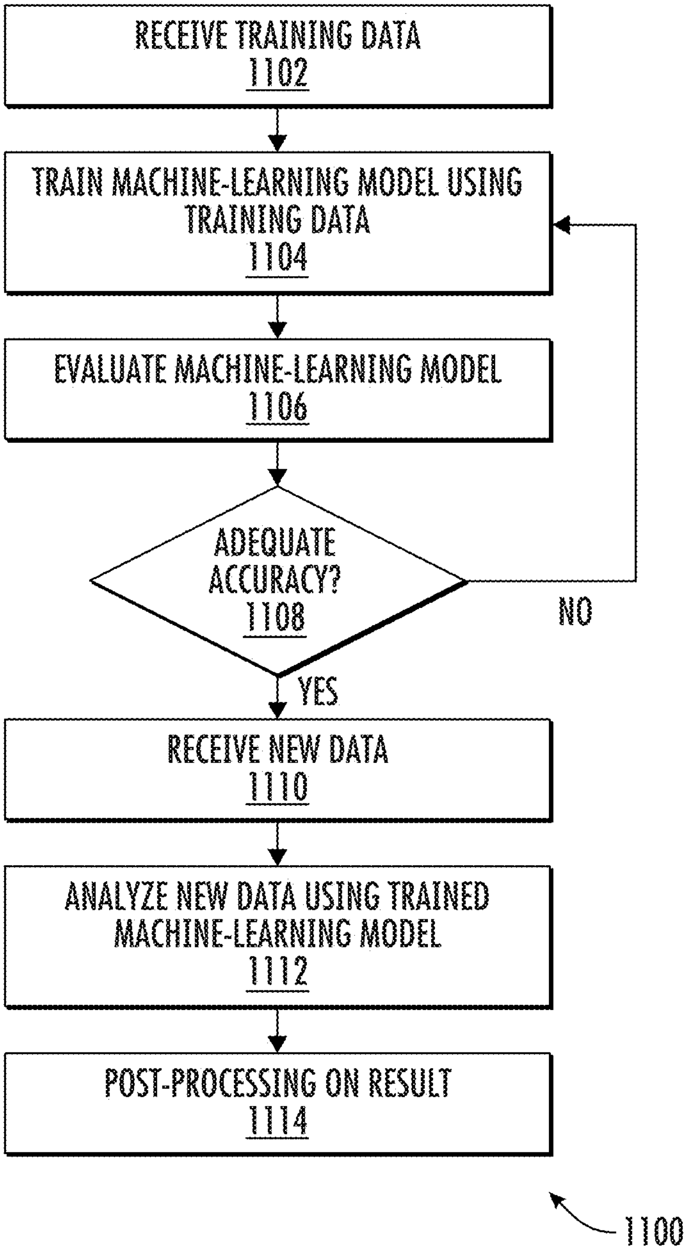
FIG. 11 illustrates a flow chart of an example of a process for generating and using a machine-learning model according to some aspects, according to embodiments of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1102, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model. In some implementations, prior to or subsequent to receipt of the training data, the training data can be processed to remove outlier training data elements.

In block 1104, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1106, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if, at 1108, the machine-learning model has an inadequate degree of accuracy for a particular task, the process can return to block 1104, where the machine-learning model can be further trained using additional training data or otherwise modified to improve accuracy. However, if, at 1108, the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
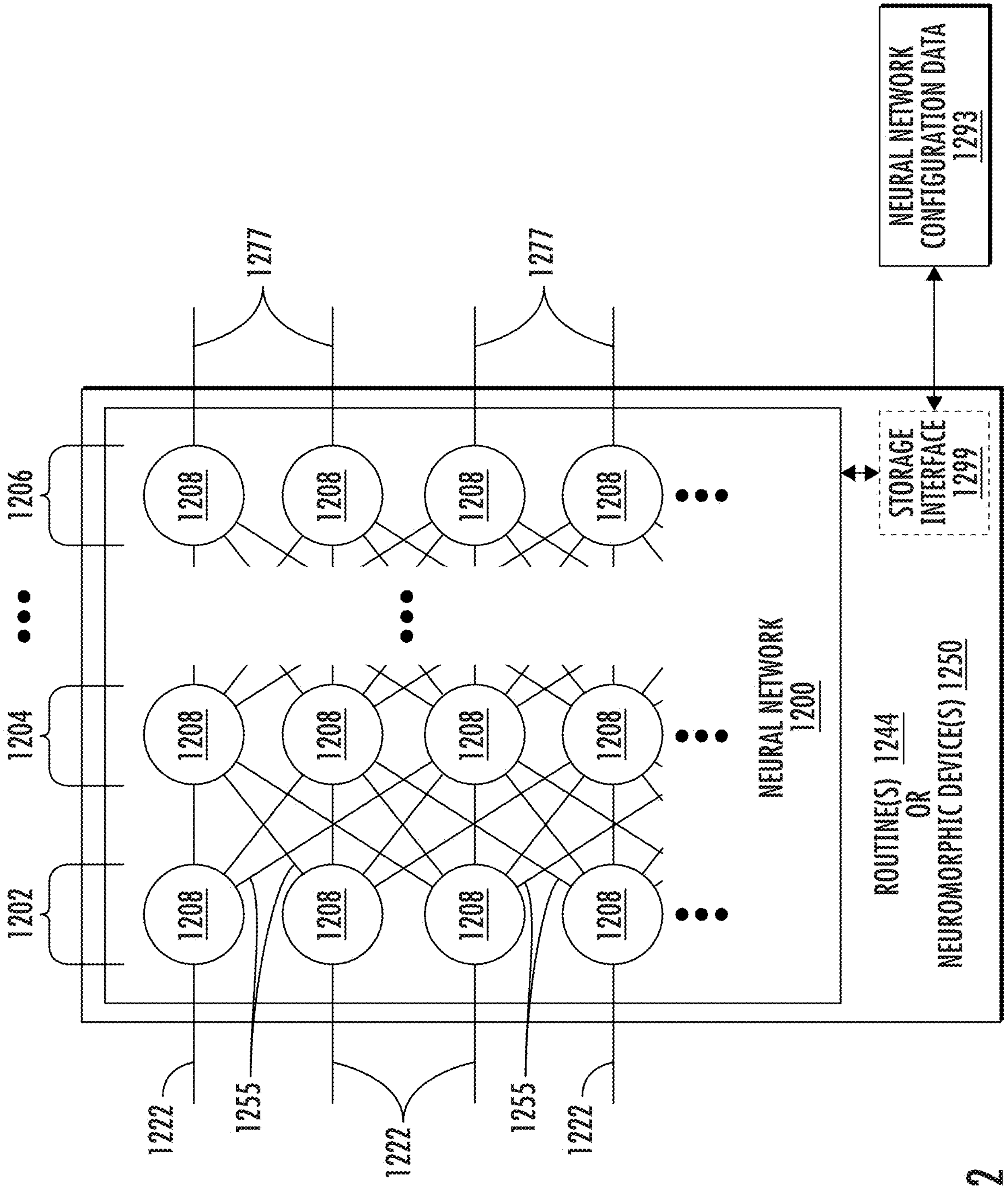
FIG. 12 illustrates an example of a machine-learning model as a neural network, according to embodiments of the present technology.

A more specific example of a machine-learning model is the neural network 1200 shown in FIG. 12. The neural network 1200 is represented as multiple layers of neurons 1208 that can exchange data between one another via connections 1255 that may be selectively instantiated thereamong. The layers include an input layer 1202 for receiving input data provided at inputs 1222, one or more hidden layers 1204, and an output layer 1206 for providing a result at outputs 1277. The hidden layer(s) 1204 are referred to as hidden because they may not be directly observable or have their inputs or outputs directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons 1208 and connections 1255 thereamong may have numeric weights, which can be tuned during training of the neural network 1200. For example, training data can be provided to at least the inputs 1222 to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 at the outputs 1277 and a desired output of the neural network 1200. Based on the gradient, one or more numeric weights of the neural network 1200 can be updated to reduce the difference therebetween, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, the connections 1255 are instantiated and/or weighted so that every neuron 1208 only propagates an output value to a subsequent layer of the neural network 1200. For example, data may only move one direction (forward) from one neuron 1208 to the next neuron 1208 in a feed-forward neural network. Such a "forward" direction may be defined as proceeding from the input layer 1202 through the one or more hidden layers 1204, and toward the output layer 1206.

In other examples, the neural network 1200 may be a recurrent neural network. A recurrent neural network can include one or more feedback loops among the connections 1255, thereby allowing data to propagate in both forward and backward through the neural network 1200. Such a "backward" direction may be defined as proceeding in the opposite direction of forward, such as from the output layer 1206 through the one or more hidden layers 1204, and toward the input layer 1202. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer ("subsequent" in the sense of moving "forward") of the neural network 1200. Each subsequent layer of the neural network 1200 can repeat this process until the neural network 1200 outputs a final result at the outputs 1277 of the output layer 1206. For example, the neural network 1200 can receive a vector of numbers at the inputs 1222 of the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation $y=\max(x, 0)$ where y is the output and x is an input value from the weighted vector. The transformed output can be supplied to a subsequent layer (e.g., a hidden layer 1204) of the neural network 1200. The subsequent layer of the neural network 1200 can receive the transformed output, multiply the transformed output by a matrix of numeric weights and a nonlinearity, and provide the result to yet another layer of the neural network 1200 (e.g., another, subsequent, hidden layer 1204). This process continues until the neural network 1200 outputs a final result at the outputs 1277 of the output layer 1206.

As also depicted in FIG. 12, the neural network 1200 may be implemented either through the execution of the instructions of one or more routines 1244 by central processing units (CPUs), or through the use of one or more neuromorphic devices 1250 that incorporate a set of memristors (or other similar components) that each function to implement one of the neurons 1208 in hardware. Where multiple neuromorphic devices 1250 are used, they may be interconnected in a depth-wise manner to enable implementing neural networks with greater quantities of layers, and/or in a width-wise manner to enable implementing neural networks having greater quantities of neurons 1208 per layer.

The neuromorphic device 1250 may incorporate a storage interface 1299 by which neural network configuration data 1293 that is descriptive of various parameters and hyper parameters of the neural network 1200 may be stored and/or retrieved. More specifically, the neural network configuration data 1293 may include such parameters as weighting and/or biasing values derived through the training of the neural network 1200, as has been described. Alternatively or additionally, the neural network configuration data 1293 may include such hyperparameters as the manner in which the neurons 1208 are to be interconnected (e.g., feed-forward or recurrent), the trigger function to be implemented within the neurons 1208, the quantity of layers and/or the overall quantity of the neurons 1208. The neural network configuration data 1293 may provide such information for more than one neuromorphic device 1250 where multiple ones have been interconnected to support larger neural networks.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network and/or a transformer model to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (Al) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. These processors may also be employed in heterogeneous computing architectures with a number of and/or a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
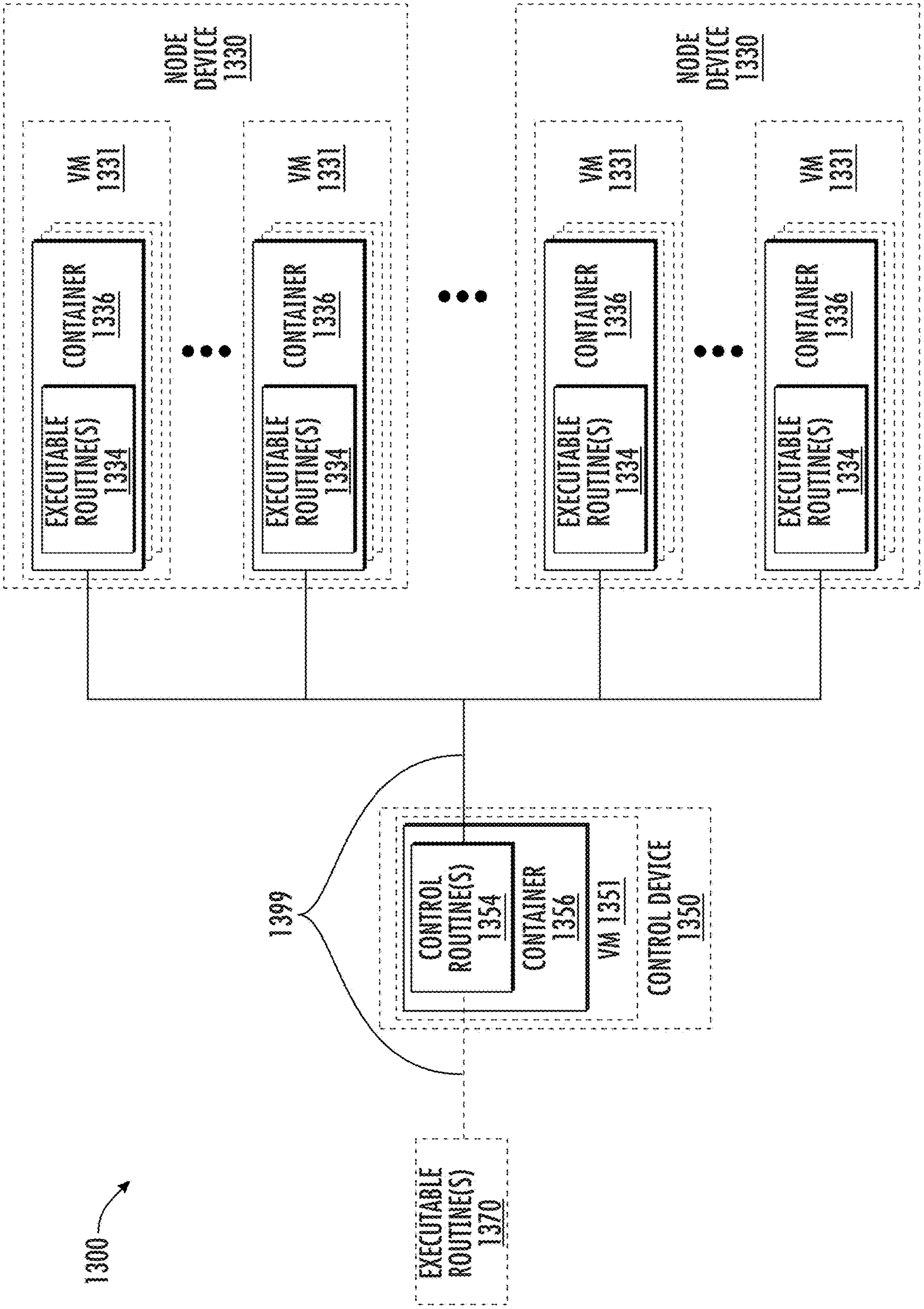
FIG. 13 illustrates various aspects of the use of containers as a mechanism to allocate processing, storage and/or other resources of a processing system to the performance of various analyses, according to embodiments of the present technology.

FIG. 13 illustrates various aspects of the use of containers 1336 as a mechanism to allocate processing, storage and/or other resources of a processing system 1300 to the performance of various analyses. More specifically, in a processing system 1300 that includes one or more node devices 1330 (e.g., the aforedescribed grid system 400), the processing, storage and/or other resources of each node device 1330 may be allocated through the instantiation and/or maintenance of multiple containers 1336 within the node devices 1330 to support the performance(s) of one or more analyses. As each container 1336 is instantiated, predetermined amounts of processing, storage and/or other resources may be allocated thereto as part of creating an execution environment therein in which one or more executable routines 1334 may be executed to cause the performance of part or all of each analysis that is requested to be performed.

It may be that at least a subset of the containers 1336 are each allocated a similar combination and amounts of resources so that each is of a similar configuration with a similar range of capabilities, and therefore, are interchangeable. This may be done in embodiments in which it is desired to have at least such a subset of the containers 1336 already instantiated prior to the receipt of requests to perform analyses, and thus, prior to the specific resource requirements of each of those analyses being known.

Alternatively or additionally, it may be that at least a subset of the containers 1336 are not instantiated until after the processing system 1300 receives requests to perform analyses where each request may include indications of the resources required for one of those analyses. Such information concerning resource requirements may then be used to guide the selection of resources and/or the amount of each resource allocated to each such container 1336. As a result, it may be that one or more of the containers 1336 are caused to have somewhat specialized configurations such that there may be differing types of containers to support the performance of different analyses and/or different portions of analyses.

It may be that the entirety of the logic of a requested analysis is implemented within a single executable routine 1334. In such embodiments, it may be that the entirety of that analysis is performed within a single container 1336 as that single executable routine 1334 is executed therein. However, it may be that such a single executable routine 1334, when executed, is at least intended to cause the instantiation of multiple instances of itself that are intended to be executed at least partially in parallel. This may result in the execution of multiple instances of such an executable routine 1334 within a single container 1336 and/or across multiple containers 1336.

Alternatively or additionally, it may be that the logic of a requested analysis is implemented with multiple differing executable routines 1334. In such embodiments, it may be that at least a subset of such differing executable routines 1334 are executed within a single container 1336. However, it may be that the execution of at least a subset of such differing executable routines 1334 is distributed across multiple containers 1336.

Where an executable routine 1334 of an analysis is under development, and/or is under scrutiny to confirm its functionality, it may be that the container 1336 within which that executable routine 1334 is to be executed is additionally configured assist in limiting and/or monitoring aspects of the functionality of that executable routine 1334. More specifically, the execution environment provided by such a container 1336 may be configured to enforce limitations on accesses that are allowed to be made to memory and/or I/O addresses to control what storage locations and/or I/O devices may be accessible to that executable routine 1334. Such limitations may be derived based on comments within the programming code of the executable routine 1334 and/or other information that describes what functionality the executable routine 1334 is expected to have, including what memory and/or I/O accesses are expected to be made when the executable routine 1334 is executed. Then, when the executable routine 1334 is executed within such a container 1336, the accesses that are attempted to be made by the executable routine 1334 may be monitored to identify any behavior that deviates from what is expected.

Where the possibility exists that different executable routines 1334 may be written in different programming languages, it may be that different subsets of containers 1336 are configured to support different programming languages. In such embodiments, it may be that each executable routine 1334 is analyzed to identify what programming language it is written in, and then what container 1336 is assigned to support the execution of that executable routine 1334 may be at least partially based on the identified programming language. Where the possibility exists that a single requested analysis may be based on the execution of multiple executable routines 1334 that may each be written in a different programming language, it may be that at least a subset of the containers 1336 are configured to support the performance of various data structure and/or data format conversion operations to enable a data object output by one executable routine 1334 written in one programming language to be accepted as an input to another executable routine 1334 written in another programming language.

As depicted, at least a subset of the containers 1336 may be instantiated within one or more VMs 1331 that may be instantiated within one or more node devices 1330. Thus, in some embodiments, it may be that the processing, storage and/or other resources of at least one node device 1330 may be partially allocated through the instantiation of one or more VMs 1331, and then in turn, may be further allocated within at least one VM 1331 through the instantiation of one or more containers 1336.

In some embodiments, it may be that such a nested allocation of resources may be carried out to effect an allocation of resources based on two differing criteria. By way of example, it may be that the instantiation of VMs 1331 is used to allocate the resources of a node device 1330 to multiple users or groups of users in accordance with any of a variety of service agreements by which amounts of processing, storage and/or other resources are paid for each such user or group of users. Then, within each VM 1331 or set of VMs 1331 that is allocated to a particular user or group of users, containers 1336 may be allocated to distribute the resources allocated to each VM 1331 among various analyses that are requested to be performed by that particular user or group of users.

As depicted, where the processing system 1300 includes more than one node device 1330, the processing system 1300 may also include at least one control device 1350 within which one or more control routines 1354 may be executed to control various aspects of the use of the node device(s) 1330 to perform requested analyses. By way of example, it may be that at least one control routine 1354 implements logic to control the allocation of the processing, storage and/or other resources of each node device 1330 to each VM 1331 and/or container 1336 that is instantiated therein. Thus, it may be the control device(s) 1350 that affects a nested allocation of resources, such as the aforedescribed example allocation of resources based on two differing criteria.

As also depicted, the processing system 1300 may also include one or more distinct requesting devices 1370 from which requests to perform analyses may be received by the control device(s) 1350. Thus, and by way of example, it may be that at least one control routine 1354 implements logic to monitor for the receipt of requests from authorized users and/or groups of users for various analyses to be performed using the processing, storage and/or other resources of the node device(s) 1330 of the processing system 1300. The control device(s) 1350 may receive indications of the availability of resources, the status of the performances of analyses that are already underway, and/or still other status information from the node device(s) 1330 in response to polling, at a recurring interval of time, and/or in response to the occurrence of various preselected events. More specifically, the control device(s) 1350 may receive indications of status for each container 1336, each VM 1331 and/or each node device 1330. At least one control routine 1354 may implement logic that may use such information to select container(s) 1336, VM(s) 1331 and/or node device(s) 1330 that are to be used in the execution of the executable routine(s) 1334 associated with each requested analysis.

As further depicted, in some embodiments, the one or more control routines 1354 may be executed within one or more containers 1356 and/or within one or more VMs 1351 that may be instantiated within the one or more control devices 1350. It may be that multiple instances of one or more varieties of control routine 1354 may be executed within separate containers 1356, within separate VMs 1351 and/or within separate control devices 1350 to better enable parallelized control over parallel performances of requested analyses, to provide improved redundancy against failures for such control functions, and/or to separate differing ones of the control routines 1354 that perform different functions. By way of example, it may be that multiple instances of a first variety of control routine 1354 that communicate with the requesting device(s) 1370 are executed in a first set of containers 1356 instantiated within a first VM 1351, while multiple instances of a second variety of control routine 1354 that control the allocation of resources of the node device(s) 1330 are executed in a second set of containers 1356 instantiated within a second VM 1351. It may be that the control of the allocation of resources for performing requested analyses may include deriving an order of performance of portions of each requested analysis based on such factors as data dependencies thereamong, as well as allocating the use of containers 1336 in a manner that effectuates such a derived order of performance.

Where multiple instances of control routine 1354 are used to control the allocation of resources for performing requested analyses, such as the assignment of individual ones of the containers 1336 to be used in executing executable routines 1334 of each of multiple requested analyses, it may be that each requested analysis is assigned to be controlled by just one of the instances of control routine 1354. This may be done as part of treating each requested analysis as one or more "ACID transactions" that each have the four properties of atomicity, consistency, isolation and durability such that a single instance of control routine 1354 is given full control over the entirety of each such transaction to better ensure that either all of each such transaction is either entirely performed or is entirely not performed. As will be familiar to those skilled in the art, allowing partial performances to occur may cause cache incoherencies and/or data corruption issues.

As additionally depicted, the control device(s) 1350 may communicate with the requesting device(s) 1370 and with the node device(s) 1330 through portions of a network 1399 extending thereamong. Again, such a network as the depicted network 1399 may be based on any of a variety of wired and/or wireless technologies, and may employ any of a variety of protocols by which commands, status, data and/or still other varieties of information may be exchanged. It may be that one or more instances of a control routine 1354 cause the instantiation and maintenance of a web portal or other variety of portal that is based on any of a variety of communication protocols, etc. (e.g., a restful API). Through such a portal, requests for the performance of various analyses may be received from requesting device(s) 1370, and/or the results of such requested analyses may be provided thereto. Alternatively or additionally, it may be that one or more instances of a control routine 1354 cause the instantiation of and maintenance of a message passing interface and/or message queues. Through such an interface and/or queues, individual containers 1336 may each be assigned to execute at least one executable routine 1334 associated with a requested analysis to cause the performance of at least a portion of that analysis.

Although not specifically depicted, it may be that at least one control routine 1354 may include logic to implement a form of management of the containers 1336 based on the Kubernetes container management platform promulgated by Cloud Native Computing Foundation of San Francisco, CA, USA. In such embodiments, containers 1336 in which executable routines 1334 of requested analyses may be instantiated within "pods" (not specifically shown) in which other containers may also be instantiated for the execution of other supporting routines. Such supporting routines may cooperate with control routine(s) 1354 to implement a communications protocol with the control device(s) 1350 via the network 1399 (e.g., a message passing interface, one or more message queues, etc.). Alternatively, or additionally, such supporting routines may serve to provide access to one or more storage repositories (not specifically shown) in which at least data objects may be stored for use in performing the requested analyses.

Figure 14:
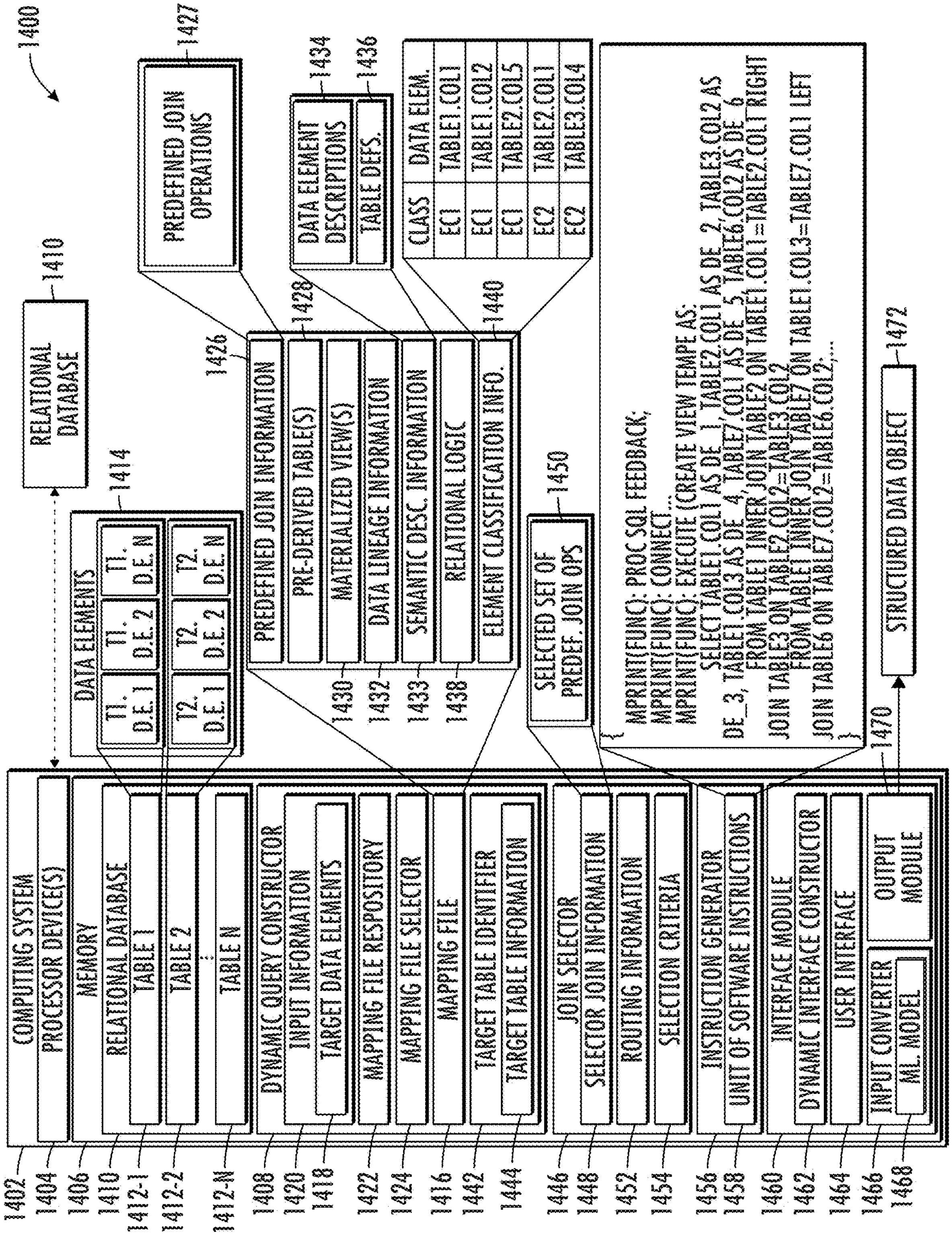
FIG. 14 is a block diagram of an example computing environment suitable for structured database mapping for dynamic SQL generation according to some implementations of the present disclosure.

FIG. 14 is a block diagram of a computing environment suitable for structured database mapping for dynamic SQL generation according to some implementations of the present disclosure. A computing environment 1400 can include a computing system 1402 with one or more processor device(s) 1404 and a memory 1406. As described herein, the "computing environment" 1400 can be any type or manner of computing environment (e.g., a collection of computing devices, systems, and related infrastructure associated with a particular entity or organization) in which data is processed or filtered.

In some implementations, the computing system 1402 may be a computing system that includes multiple computing devices. Alternatively, in some implementations, the computing system 1402 may be one or more computing devices within a computing system that includes multiple computing devices. Similarly, the processor device(s) 1404 may include any computing or electronic device capable of executing software instructions to implement the functionality described herein.

The memory 1406 can be or otherwise include any device(s) capable of storing data, including, but not limited to, volatile memory (random access memory, etc.), non-volatile memory, storage device(s) (e.g., hard drive(s), solid state drive(s), etc.). In some implementations, the memory 1406 can include a containerized unit of software instructions (i.e., a "packaged container"). The containerized unit of software instructions can collectively form a container that has been packaged using any type or manner of containerization technique.

A containerized unit of software instructions can include one or more applications, and can further implement any software or hardware necessary for execution of the containerized unit of software instructions within any type or manner of computing environment. For example, the containerized unit of software instructions can include software instructions that contain or otherwise implement all components necessary for process isolation in any environment (e.g., the application, dependencies, configuration files, libraries, relevant binaries, etc.).

In some implementations, the computing environment 1400 can include multiple types of nodes. As described herein, a "node" generally refers to a discrete unit of hardware and/or software resources. In some instances, nodes within the computing environment 1400 can be configured to perform specific tasks. For example, some nodes within the confidential computing environment 1400 can be configured as "compute" or "processing" nodes that handle processing tasks or provide processing-heavy services. Compute nodes are generally allocated with hardware devices that can facilitate processing tasks, such as Graphics Processing Units (GPUs), Central Processing Units (CPUs), Application-specific Integrated Circuits (ASICs), Field-Programmable Gate Arrays (FPGAs), etc.

Conversely, storage nodes can be allocated with hardware devices to facilitate storage tasks, such as storage devices (e.g., hard drives, etc.), memory, high-bandwidth network devices, physical storage media, etc.). It should be noted that in some instances, storage nodes can include processing devices (e.g., CPUs, etc.) to facilitate storage operations (e.g., read/write operations) and processing nodes can include storage devices (e.g., random access memory) to facilitate processing operations.

The memory 1406 can include a dynamic query constructor 1408. The dynamic query constructor 1408 can dynamically construct a query for a relational database 1410. The relational database 1410 can include a plurality of tables 1412-1-1412-N (generally, tables 1412). The plurality of tables 1412 can store a plurality of data elements 1414. As described herein, a "data element" can refer to a column of a relational database table, or the like. For example, some of the data elements 1414 can be columns of the table 1412-1, while other data elements of the data elements 1414 can be columns of the tables 1412-2, 1412-N, etc.

The dynamic query constructor 1408 can dynamically construct a query for the relational database by leveraging a mapping file 1416 to generate a query that retrieves target data elements 1418 selected by a user. The dynamic query constructor 1408, and any modules, processes, programs, applications, etc. implemented or otherwise accessed by the dynamic query constructor 1408, can be implemented using any conventional hardware and/or software resources, such as server computing system(s), virtualized computing device(s), structured database libraries or modules, etc.

To construct the query, the dynamic query constructor 1408 can obtain input information 1420. The input information 1420 can select (or otherwise indicate selection of) target data elements 1418 from the data elements 1414 of the relational database 1410. In some implementations, the input information 1420 can be obtained via a user selecting the target data elements 1418 (or interface elements representing the target data elements 1418) via a user interface displayed to the user. Additionally, or alternatively, in some implementations, the input information 1420 can be a natural language input (e.g., textual content, audio data, etc.) that describes the target data elements (or attributes thereof). The manner in which the input information 1420 is obtained by the dynamic query constructor 1408 will be discussed in greater detail subsequently.

The dynamic query constructor 1408 can access the mapping file 1416. In some implementations, the mapping file 1416 can be one of a plurality of mapping files stored to a mapping file repository 1422. The dynamic query constructor 1408 can include a mapping file selector 1424 that selects the mapping file 1416 from the mapping file repository 1422. For example, assume that the memory 1406 of the computing system includes the relational database 1410 and a number of other relational databases. The mapping file repository 1422 can store mapping files that are each associated with a corresponding relational database. If the target data elements 1418 are included in the relational database 1410, the mapping file selector 1424 can identify the relational database 1410 based on the input information 1420, and then select the mapping file 1416 that corresponds to the relational database 1410.

A mapping file, as described herein, can refer to a collection of information that defines, or otherwise relates to, the contents of a particular relational database. The information stored to a mapping file can be leveraged to dynamically construct an SQL query to retrieve disparate data elements selected by a user. The information included in a mapping file can include information such as predefined join information, SQL logic, join type information, aliases for data elements, descriptions of data elements, pre-built filters, pre-built derived columns, etc.

More specifically, the mapping file 1416 can include predefined join information 1426. The predefined join information 1426 can define a plurality of predefined join operations 1427. Each of the predefined join operations can specify a join between two data elements of the relational database 1410 and a corresponding join type (e.g., LEFT JOIN, INNER JOIN, RIGHT JOIN, OUTER JOIN, etc.). For example, the predefined join information 1426 may define a LEFT JOIN operation between a data element from the table 1412-1 and a data element from the table 1412-2. In some implementations, the predefined join information 1426 can indicate which of the data elements being joined is a foreign key and which is a primary key. For example, if the data element from the table 1412-1 is a column of unique identifiers that uniquely identifies each row of the table 1412-1, the predefined join information 1426 may define that particular data element as a primary key and define the other data element being joined as a foreign key.

The mapping file 1416 can include pre-derived tables 1428. The pre-derived tables 1428 can include tables that store the results of complex queries which have already been computed and saved for faster retrieval. Unlike regular tables, or "views," which are virtual and generate results dynamically, pre-derived tables save their data physically in the database, allowing for quicker access to frequently queried data. In this manner, the mapping file 1416 can be modified to include pre-derived tables that are commonly requested by users. For example, assume that the input information 1420 specifies a set of target data elements that require a large number of join operations to retrieve. If the input information 1420 is one of a multitude of instances in which users requested the same target data elements, the dynamic query constructor 1408 can modify the mapping file 1416 to add a table that includes the requested target data elements, therefore eliminating the need to perform the large number of join operations in response to future inputs requesting the same set of target data elements. Additionally, or alternatively, the mapping file 1416 can include materialized views 1430 to store the same manner of pre-derived information. The mapping file 1416 may interchangeably store the pre-derived tables 1428 and/or the materialized views 1430 based on the type of relational database software used, the size of the retrieved information, etc.

In some implementations, the mapping file 1416 can include data lineage information 1432. The data lineage information 1432 can include store detailed information about changes to particular data elements, such as a modification timestamp for a last modification to a data element, a creation timestamp indicating when the data element was created, etc.

In some implementations, the mapping file 1416 can include semantic description information 1433. The semantic description information 1433 can include semantic descriptors for the data elements 1414 within the relational database 1410. A "semantic descriptor" can refer to a portion of textual content that provides a semantic description of the information stored within a particular data element or may otherwise describe a "purpose" or rationale for including a particular data element within a table. For example, the semantic description information 1433 can include semantic descriptors for the table 1412-1. The semantic description information 1433 can describe the type of information stored to the table 1412-1 or otherwise describe a "purpose" associated with the inclusion of the table 1412-1 in the relational database 1410.

In some implementations, the semantic description information 1433 can include data element descriptions 1434. The data element descriptions 1434 (i.e., column descriptions, etc.) can include semantic descriptions of the information stored to each data element of the tables 1412. For example, assume that one data element of the table 1412-1 is labeled "PRODUCT_ID". The data element descriptions 1434 can include a description of the "PRODUCT_ID" data element such as "this stores a unique identifier for each type of product sold."

Similarly, in some implementations, the semantic description information 1433 can include table definitions 1436. The table definitions 1436 can include semantic descriptions of the information stored to each of the tables 1412. To follow the previous example, assume that table 1412-1 is labeled "PRODUCT_ID". The table definitions 1436 may define the table 1412-1 as a "table that stores a record of each product currently being manufactured by the organization."

The mapping file 1416 can include relational logic 1438 for the relational database 1410. More specifically, the relational logic 1438 can define rules, constraints, and relationships that control how data is related between tables within the relational database 1410. The relational logic 1438 can specify particular data elements within particular tables as primary keys or foreign keys (and/or mappings thereof). The relational logic 1438 can also specify constraints to reinforce referential integrity within the relational database 1410. For example, the relational logic 1438 may include cascading rules that specify what happens to related data elements when a data element (or a record, such as a row of a table) is deleted or updated. For another example, the relational logic 1438 may include check constraints for certain tables of the tables 1412 (e.g., rules that constrain data to certain formats, etc.).

The mapping file 1416 can include element classification information 1440. The element classification information 1440 can associate some (or all) of the data elements 1414 with a corresponding "element class" of a plurality of element classes. As described herein, an "element class" can refer to a particular classification of data elements of the relational database. For example, assume that table 1412-1 is a table labeled "equipment" which includes an "equipment cost" data element that stores the cost of a particular piece of manufacturing equipment. Further assume that the table 1412-2 is a table labeled "raw materials" which includes a "raw material cost" data element that stores the costs of raw materials used in manufacturing. Although the "equipment cost" data element and the "raw materials" data element are not located within the same table, and do not reference each other as keys, the element classification information 1440 can classify both data elements as belonging to a "costs" element class that is associated with any data element related to business-related costs or expenditures.

In some implementations, the element classification information 1440 can be utilized to populate a user interface for the user to select the target data elements 1418. For example, the dynamic query constructor can dynamically construct an interface that lists the data elements 1414 by their class, rather than their associated table. In this manner, the user can more intuitively browse closely related data elements without regard for their corresponding table, thus substantially reducing the knowledge required for the user to create a query. Dynamic creation of a user interface based on the element classification information 1440 will be discussed with regards to FIGS. 17A-17D of the present disclosure.

In some implementations, the dynamic query constructor 1408 can include a target table identifier 1442. The target table identifier 1442 can identify target tables to target with a dynamically generated query to retrieve the target data elements 1418 specified by the input information 1420. As described herein, a "target table" may refer to either a table that includes a target data element and/or a table that must be joined to access a target data element. For example, assume that table 1412-1 does not include one of the target data elements 1418 while the table 1412-2 does include one of the target data elements 1418. If the most efficient method to retrieve the target data elements stored in the table 1412-2 is to join that table with the table 1412-1, the table 1412-1 can be labeled as a target table even though the table does not include any target data elements 1418.

The target table identifier 1442 can generate target table information 1444. The target table information 1444 can specify one or more target tables of the tables 1412. Each of the target table(s) can include one or more of the target data elements 1418. As such, a table of the tables 1412 that includes a target data element may be referred to as a "target table," while a table that does not include a target data element may be referred to as a "non-target table." For example, assume that the mapping file 1416 includes data lineage information 1432. The data lineage information 1432 can include a record of each of the data elements 1414 and a corresponding table in which each data element is located. Based on the data lineage information 1432, the target table identifier 1442 can generate the target table information 1444 to identify the tables from which the target data elements 1418 can be retrieved.

In some implementations, the dynamic query constructor 1408 can include a join selector 1446. The join selector 1446 can work in conjunction with the target table identifier 1442 to generate selected join information 1448. The selected join information 1448 can indicate a selected set of predefined join operations 1450 selected from the plurality of predefined join operations 1427. The selected set of predefined join operations 1450 can be selected from the plurality of pre-defined join operations 1427 based on the relational logic 1438. The selected set of predefined join operations 1450 can include a minimum set of join operations necessary to retrieve the target data elements 1418.

For example, assume that tables 1412-1, 1412-2, 1412-3, and 1412-4 each include one or more of the target data elements 1418 while the table 1412-5 does not include one of the target data elements 1418 (tables 1413-3-1414-5 not explicitly illustrated). If both tables 1412-4 and 1412-5 include a foreign key that references the primary key of table 1412-3, the join selector 1446 may select a join that joins table 1412-4 to table 1412-3 rather than joining table 1412-5, as table 1412-4 is a target table that must be accessed to retrieve the target data element included in table 1412-4. Alternatively, if only table 1412-5 included a foreign key that references table 1412-3, the join selector 1446 may select a join from one of the tables 1412-1, 1412-2, and 1412-4 to the table 1412-5, and then another join from the table 1412-5 to the table 1412-3. In this manner, the join selector 1446 can select a set of predefined joins that most "efficiently" retrieves the target data elements 1418.

In some implementations, the join selector 1446 can select the selected set of selected join operations 1450 based on the relational logic 1438 of the mapping file 1416. To follow the previous example, the relational logic 1438 can include information which specifies that the table 1412-4 is related to (i.e., references) the table 1412-3. For example, the relational logic 1438 may specify that a column 3 (i.e., data element 3) of table 1412-4 is a foreign key that references column 1 of table 1412-3 as a primary key. Based on the relational logic 1438, the join selector can select a join that joins the table 1412-4 to the table 1412-3 based on the reference identified by the.

In some implementations, the join selector 1446 can generate routing information 1452. The routing information 1452 can describe one or more candidate routes. As described herein, a "candidate route" can refer to a sequence of tables joined by a corresponding sequence of join operations to retrieve the target data elements 1418. For example, a first candidate route described by the routing information 1452 may specify an INNER JOIN on column 1 of table 1412-1 and column 3 of table 1412-2, followed by a LEFT JOIN on column 4 of table 1412-2 and column 1 of table 1412-4, followed by a RIGHT JOIN on column 2 of table 1412-4 and column 1 of table 1412-5, etc. A second candidate route described by the routing information 1452 may specify an INNER JOIN on column 1 of table 1412-1 and column 2 of table 1412-3, followed by a RIGHT JOIN on column 3 of table 1412-3 and column 1 of table 1412-4, etc. As such, the selected set of selected join operations 1450 can, in some implementations, collectively form a candidate route if organized in sequence.

In some implementations, the mapping file 1416 can include (or can be modified to include based on historical results) candidate routes (or portions thereof) used previously by the join selector 1446. For example, assume that the table 1412-5 is generally only accessible via a join from the table 1412-4. Further assume that table 1412-4 is only accessible via a join from the table 1412-3. If table 1412-5 holds a data element that is commonly requested, the mapping file 1416 can store (or can be modified to store) a pre-configured route portion that joins table 1412-3 to table 1412-4 and joins table 1412-4 to table 1412-5. In this manner, if a user requests a target data element included in the table 1412-5, the join selector 1446 can simply retrieve the pre-configured route portion from the mapping file 1416. Alternatively, if users do not commonly request data elements from the table 1412-5, the join selector 1446 can compute the route in real-time.

In some implementations, a candidate route can be selected by the join selector based on selection criteria 1454. Additionally, or alternatively, in some implementations, the selected set of selected join operations 1450 can be selected at least partially based on the selection criteria 1454. In some implementations, the selection criteria 1454 can be criteria for evaluating the efficiency of a candidate route. In some implementations, the selection criteria 1454 can include a join quantity criterion that minimizes a quantity of join operations included in a route. For example, the join selector 1446 can satisfy the join quantity criterion by selecting the selected set of selected join operations 1450 that includes the least possible join operations.

Additionally, or alternatively, in some implementations, the selection criteria 1454 can include a content criterion that minimizes a bandwidth usage associated with the contents of each table joined by the selected set of selected join operations 1450. For example, if one table includes a large quantity of images, while another table includes only textual content, the join selector 1446 may select the table that includes textual content to minimize a bandwidth usage associated with accessing and manipulating a table with a large quantity of images.

Additionally, or alternatively, in some implementations, the selection criteria 1454 can include a computational complexity criterion that minimizes an estimated computational complexity associated with the selected set of selected join operations 1450. For example, assume that one table includes millions of records while another table includes hundreds of records. If both tables can be used for the same purpose, the join selector 1446 can select the smaller table to satisfy the computational complexity criterion. Additionally, or alternatively, in some implementations, the selection criteria 1454 can include a target table criterion that minimizes a quantity of non-target tables included in the selected set of selected join operations 1450.

The dynamic query constructor 1408 can include an instruction generator 1456. The instruction generator 1456 can generate a unit of software instructions 1458 that, when executed, implements the selected set of join operations 1450. In some implementations, the unit of software instructions 1458 can be, or otherwise include, instructions written in a query language such as SQL that can be used to query the relational database 1410. For example, if the selected set of predefined join operations 1450 are stored as SQL, the instructions generator 1456 can incorporate the selected set of predefined join operations 1450 in a query to generate the unit of software instructions 1458.

To follow the depicted example, assume that the selected set of predefined join operations 1450 includes an inner join from column 1 (i.e., data element 1) of table 1412-1 to column 1 of table 1412-2, and a right join from column 2 of table 1412-2 to column 2 of table 1412-3 (not explicitly illustrated). The instruction generator 1456 can generate a unit of software instructions that implements these join instructions in SQL, such as "FROM TABLE1 INNER JOIN TABLE2 ON TABLE1.COL1=TABLE2.COL1 RIGHT JOIN TABLE3 ON TABLE2.COL2=TABLE3.COL2."

Additionally, in some implementations, the unit of software instructions 1458 can include additional SQL instructions that serve to make the query more efficient, readable, consistent, etc. To follow the depicted example, the unit of software instructions 1458 can include a SELECT SQL operation that assigns aliases to specific data elements for more efficient manipulation, such as "SELECT TABLE1.COL1 as DE_1, TABLE2.COL1 as DE_2, TABLE3.COL2 as DE_3, TABLE1.COL3 as DE_4, TABLE7.COL1 as DE_5, TABLE6. COL2 as DE_6."

Additionally, or alternatively, in some implementations, the unit of software instructions can include instructions written in a language other than a structured query language. For example, the unit of software instructions 1458 may additionally include instructions written in a language such as Python™ or the like. To follow the depicted example, the unit of software instructions 1458 can include a number of macro system options, such as MPRINT(FUNC): . . . , that are written in the SAS® programming language. As such, it should be generally understood that the unit of software instructions 1458 can include instructions written using any type of programming language.

In some implementations, the dynamic query constructor 1408 can include an interface module 1460. The interface module 1460 can handle the generation and/or display of a user interface sufficient to obtain the input information 1420 from a user. To do so, in some implementations, the interface module 1460 can include a dynamic interface constructor 1462. The dynamic interface constructor 1462 can dynamically construct a user interface 1464. More specifically, the dynamic interface constructor 1462 can dynamically construct a user interface 1464 based at least in part on the mapping file 1416. For example, the user interface 1464 can include a set of interface elements. Each of the interface elements can represent a corresponding data element of the data elements 1414. When an interface element is selected by a user, the input information 1420 can be generated indicating selection of the data element represented by the interface element. The set of interface elements included in the user interface 1464 can be dynamically selected by the dynamic interface constructor 1462 (e.g., based on historical user information for the particular user or for multiple users, based on a prior query from the user, etc.).

In some implementations, the interface elements included in the user interface 1464 can be grouped based on the element classification information 1440. To follow the depicted example, columns 1 and 2 of table 1412-1, and column 2 of table 1412-5 (not explicitly illustrated), can be classified as belonging to a first element class EC1. Column 1 of Table 2 and column 4 of table 3 can be classified as belonging to a second element class EC2. A first subset of interface elements representing data elements classified as EC1 can be grouped together when displayed (e.g., within a drop-down menu, selection menu, check-box menu, etc.) in a first portion of the interface. A second subset of interface elements representing data elements classified as EC2 can be grouped together separately from the EC1 elements and displayed within a second portion of the user interface 1464.

In some implementations, the interface module 1460 can cause the user interface 1464 to be displayed to a user. For example, the interface module 1460 can output data descriptive of the user interface 1464 for display to the user, render the user interface 1464 for display to the user, etc. For another example, the interface module 1460 can provide data descriptive of the user interface 1464 to a user computing device that can display the user interface 1464 to the user. Additionally, the interface module 1460 can obtain the input information 1420 via the user interface 1464. For example, assume that the user interface 1464 is displayed to a user locally at a user computing device separate from the computing system 1402. The user can enter the input information 1420 via the user interface at the user computing device. The user computing device can then transmit the input information 1420 to the computing system 1402.

In some implementations, the user interface 1464 can include interface elements representing one or more pre-built filters stored in the mapping file 1416. Upon selection of a pre-built filter by a user via the user interface 1464, the dynamic query constructor 1408 can apply the pre-built filter to results retrieved in response to the unit of software instructions 1458. Similarly, in some implementations, the dynamic interface constructor 1408 can, via the user interface 1464, receive additional user input information descriptive of a user-created filter can be received via the user interface 1464. The user-created filter can then be applied to the results retrieved by executing the unit of software instructions 1458. In some implementations, the dynamic query constructor 1408 can modify the mapping file 1416 to add the user-created filter to the plurality of pre-built filters of the mapping file based on an inclusion criterion, such as a number of prior occurrences in which information descriptive of the user-created filter (or a similar filter) was received via the user interface.

In some implementations, the user interface 1464 can include a preview interface element that depicts the unit of software instructions 1458. Additionally, in some implementations, the preview interface element can include a text editor interface element configured to receive user inputs to modify the unit of software instructions. The interface module 1460 can receive modification input information via the preview interface element that describes one or more modifications to the unit of software instructions 1458. The interface module 1460 can then apply these modification(s) to the unit of software instructions 1458.

In some implementations, the user interface 1464 can include a "pause" interface element (e.g., a selectable icon including a pause symbol, etc.). The pause interface element can be used by a user to pause execution of the unit of software instructions 1458. For example, assume that the dynamic query constructor 1408 begins to execute the unit of software instructions 1458. If the user determines that they wish to search for a different data element, the user can pause execution of the unit of software instructions 1458 by selecting the pause interface element.

The user interface 1464 will be illustrated and discussed in greater detail with regards to FIGS. 17A-17D.

In some implementations, the dynamic query constructor 1408 can include an input converter 1466. The input converter 1466 can convert input information received from a user into a different format. Specifically, the input converter 1466 can convert a natural language input into the input information 1420 that selects the target data elements 1418.

Figure 15:
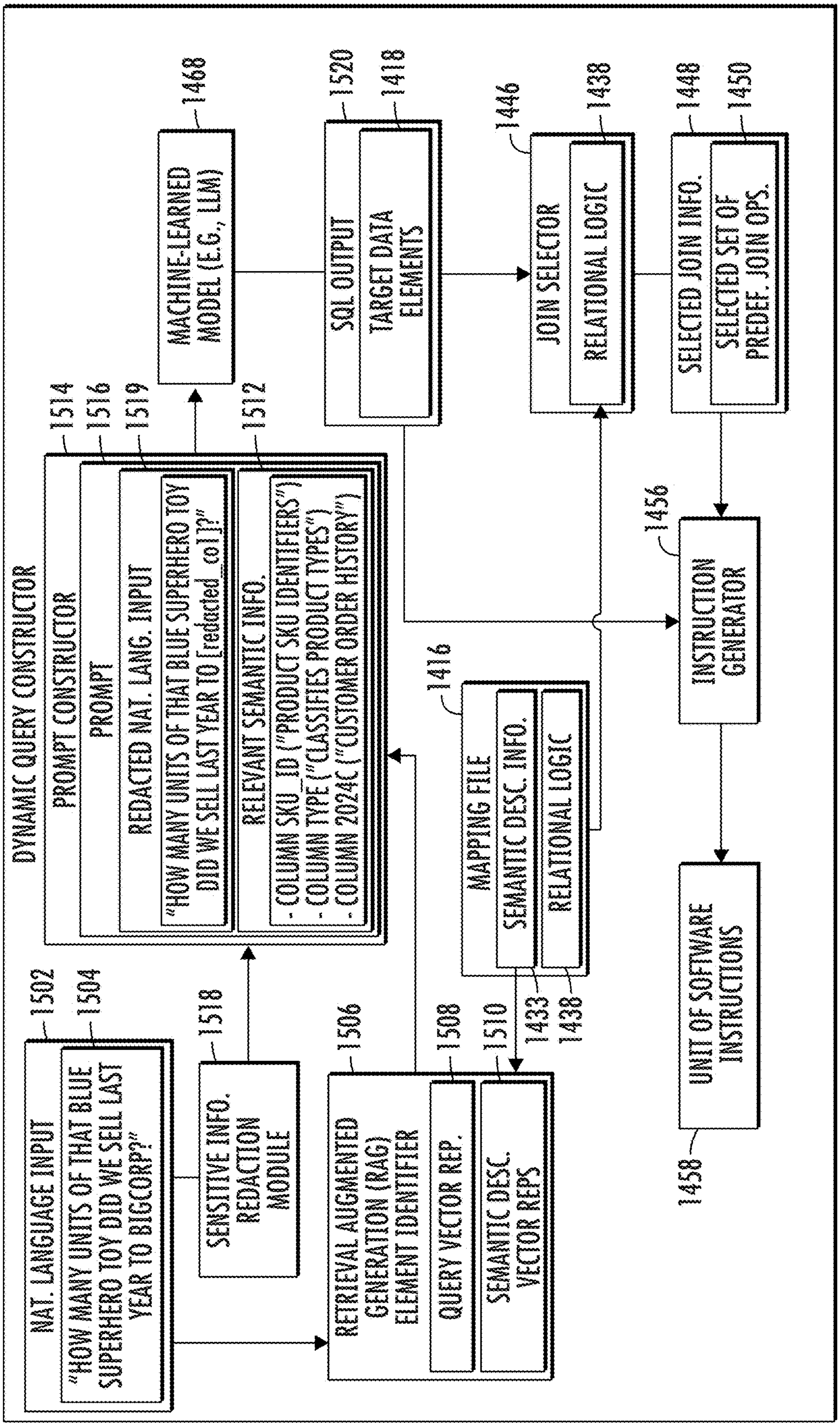
FIG. 15 is a data flow diagram for an example of converting a natural language input to a unit of software instructions that implements a set of predefined join operations from a mapping file according to some implementations of the present disclosure.

For a more specific example, turning to FIG. 15, FIG. 15 is a data flow diagram for converting a natural language input to a unit of software instructions that implements a set of predefined join operations from a mapping file according to some implementations of the present disclosure. FIG. 15 will be discussed in conjunction with FIG. 14. More specifically, a natural language input 1502 can be obtained from a user (e.g., via the user interface 1464, etc.). The natural language input 1502 can store a query 1504 for the relational database 1410. The natural language input 1502 can include any format of data sufficient to store a query conveyed via natural language, such as audio data, video data, image data, textual data, etc. For example, the natural language input can be a text-based query, a transcription of a spoken utterance of a query, a query image, a screenshot, etc.

The natural language input 1502 can be processed with a Retrieval Augmented Generation (RAG) element identifier 1506. The RAG element identifier 1506 can process the natural language input 1502 (and/or the query 1504) to generate a query vector representation 1508 of the query 1504. The RAG element identifier 1506 can also include (and/or generate) a plurality of semantic descriptor vector representations 1510. Each of the semantic descriptor vector representations 1510 can be a vector representation of a corresponding semantic descriptor extracted from the semantic description information 1433 of the mapping file 1416. For example, the RAG element identifier 1506 can utilize an encoder model (e.g., an encoder portion of the machine-learned model 1468, etc.) to process each of the semantic descriptors extracted from the semantic description information 1433 to generate the semantic descriptor vector representations 1510.

The RAG element identifier 1506 can perform a similarity search between the query vector representation 1508 and the semantic descriptor vector representations 1510. For example, the RAG element identifier 1506 may perform a nearest neighbor search to select the semantic descriptors most similar to the query 1504. Once complete, the RAG element identifier 1506 can generate relevant semantic information 1512. The relevant semantic information 1512 can include a portion of the semantic description information 1433 that includes the semantic descriptors identified via the similarity search between the query vector representation 1508 and the semantic descriptor vector representations 1510.

To follow the depicted example, the semantic description information 1433 includes semantic descriptors for column SKU_ID ("product SKU identifiers"), column TYPE ("classifies product types") and column 2024C ("customer order history"). The semantic descriptors, alongside other semantic descriptors, can be extracted and processed by the RAG element identifier 1506 to generate the semantic descriptor vector representations 1510. The RAG element identifier 1506 can perform the similarity search between the query vector representation 1508 and the semantic descriptor vector representations 1510 to identify the semantic descriptors for columns SKU_ID, TYPE, and 2024C as being most similar to the query 1504. The RAG element identifier 1506 can then generate the relevant semantic information 1512, which includes the semantic description information 1433 for those columns.

It should be noted that the RAG element identifier 1506 generates the relevant semantic information 1512 so that RAG can be performed by the machine-learned model 1468. As described herein, "RAG", or retrieval augmented generation, can refer to a technique in which a machine-learned model is provided with contextual information alongside a prompt so that the model responds to the prompt based on the contextual information. By responding to the prompt based on the contextual information, the likelihood that the model hallucinates can be reduced substantially. However, context windows (e.g., the quantity of contextual information that can be used) are relatively small and computationally expensive to fill. As such, by generating the relevant semantic information 1512 from the semantic description information 1433 for use as a contextual input, rather than the semantic description information 1433 itself, the RAG element identifier 1506 can enable the use of RAG to substantially reduce the probability of a hallucinated output while minimizing the computational cost of RAG.

The relevant semantic information 1512 can be provided alongside the natural language input 1502 (and/or the query 1504) to a prompt constructor 1514. The prompt constructor 1514 can construct a prompt 1516 for the machine-learned model 1468 (e.g., a machine-learned LLM, a large foundational model, large multimodal model, etc.). The prompt 1516 can include the natural language input 1502 and the relevant semantic information 1512. In addition, the prompt constructor 1514 can include certain instructions in the prompt 1516 that cause the machine-learned model 1468 to process the prompt 1516 more efficiently or accurately. For example, the prompt constructor 1514 can include instructions in the prompt 1516 to utilize the relevant semantic information 1512 as contextual information. For another example, the prompt constructor 1514 can include instructions in the prompt 1516 to instruct the machine-learned model 1468 to generate an SQL query.

In some implementations, prior to inclusion in the prompt 1516, the natural language input 1502 can be processed using a sensitive information redaction module 1518. The sensitive information redaction module 1518 can identify an element of sensitive information within the query for the relational database and replace it with a placeholder information element to obtain a redacted natural language input 1519. In this manner, the sensitive information redaction module 1518 can ensure that sensitive information is not leaked to a third-party model, such as a LLM. To follow the depicted example, the query 1504 can include the name of a customer (e.g., "BIGCORP"). The sensitive information redaction module 1518 can identify the customer name as an element of sensitive information. The sensitive information redaction module 1518 can then replace the element of sensitive information with a placeholder information element (e.g., "redacted_col1"). In this manner, the sensitive information redaction module 1518 can ensure that sensitive information is not exposed to third parties by the prompt 1516 being processed by the machine-learned model 1468 (e.g., if the model is a third-party model, is hosted by a third-party service, etc.).

The machine-learned model 1468 can process the prompt 1516 to generate an SQL output 1520. The SQL output 1520 can be an SQL query configured to retrieve the target data elements identified by the query 1504. As such, the SQL output 1520 can identify the target data elements 1418 based on the query 1504. More specifically, it is relatively common for a query from a user, such as the query 1504, to not explicitly indicate the target data elements needed if the user does not possess a deep knowledge of the relational database 1410. However, by generating the SQL output 1520 based on the relevant semantic information 1512, the machine-learned model 1468 can predict the target data elements 1418 by generating an SQL query that specifies certain columns (i.e., data elements) from the relational database 1410.

The SQL output 1520 can be processed by the join selector 1446 based on the relational logic 1438 to generate the selected join information 1448. More specifically, the prompt 1516 can include the relevant semantic information 1512 but does not include the corresponding relational logic 1438 from the mapping file 1416. As such, the machine-learned model 1468 does not have knowledge of the relational logic 1438 and thus the SQL output 1520 generated by the machine-learned model 1468 does not include the relational logic 1438. Instead, the join selector 1446 can identify the target data elements 1418 from the SQL output 1520 (e.g., by identifying data element labels or semantic descriptors in the SQL output 1520). The join selector 1446 can then generate the selected join information 1448, which can include the selected set of predefined join operations 1450. The selected set of predefined join operations 1450 can include a minimum set of join operations necessary to retrieve the target data elements 1418.

The instruction generator 1456 can obtain the SQL output 1520 and the selected set of predefined join operations 1450. The instruction generator 1456 can generate the unit of software instructions 1458 based on the SQL output 1520 and the selected set of predefined join operations 1450. More specifically, the instruction generator 1456 can modify the SQL output 1520 to implement the selected set of predefined join operations 1450. For example, if the SQL output 1520 includes join logic generated by the machine-learned model 1468, the instruction generator 1456 can replace the generated join logic with the selected set of predefined join operations 1450.

In some implementations, the instruction generator 1456 can modify the SQL output 1520 to replace information elements that are not used within the relational database 1410 (e.g., placeholder information elements, aliased information elements, informal labels, etc.) with associated elements that are used within the relational database 1410. For example, assume that the mapping file 1416 includes a pre-derived table that uses descriptive column names (e.g., "products sold last year") to represent non-descriptive column names (e.g., PSLY_2023) for columns of a table stored to the relational database 1410 (e.g., table 1412-1, etc.). Further assume that the descriptive column names are included in the relevant semantic information 1512 in place of the non-descriptive column names to provide the machine-learned model 1468 with additional context. Based on the prompt 1516, the machine-learned model 1468 can generate the SQL output 1520 to include the descriptive column names. However, these descriptive column names are not recognized by the relational database 1410. As such, the instruction generator 1456 can replace the descriptive column names with their corresponding actual column names so that the SQL output 1520 is compatible with the relational database 1410 (e.g., replacing "products sold last year" with "PSLY_2023").

Returning to FIG. 14, the dynamic query constructor 1408 can include an output module 1470. Once the unit of software instructions 1458 is executed to retrieve the target data elements 1418, the output module 1470 can output a structured data object 1472 that includes the target data elements 1418. For example, the output module 1470 can generate a .csv file or the like to store the target data elements 1418. For another example, the output module 1470 can generate a temporary view or temporary table to store the target data elements 1418 and display the target data elements 1418 to the user.

Figure 16A:
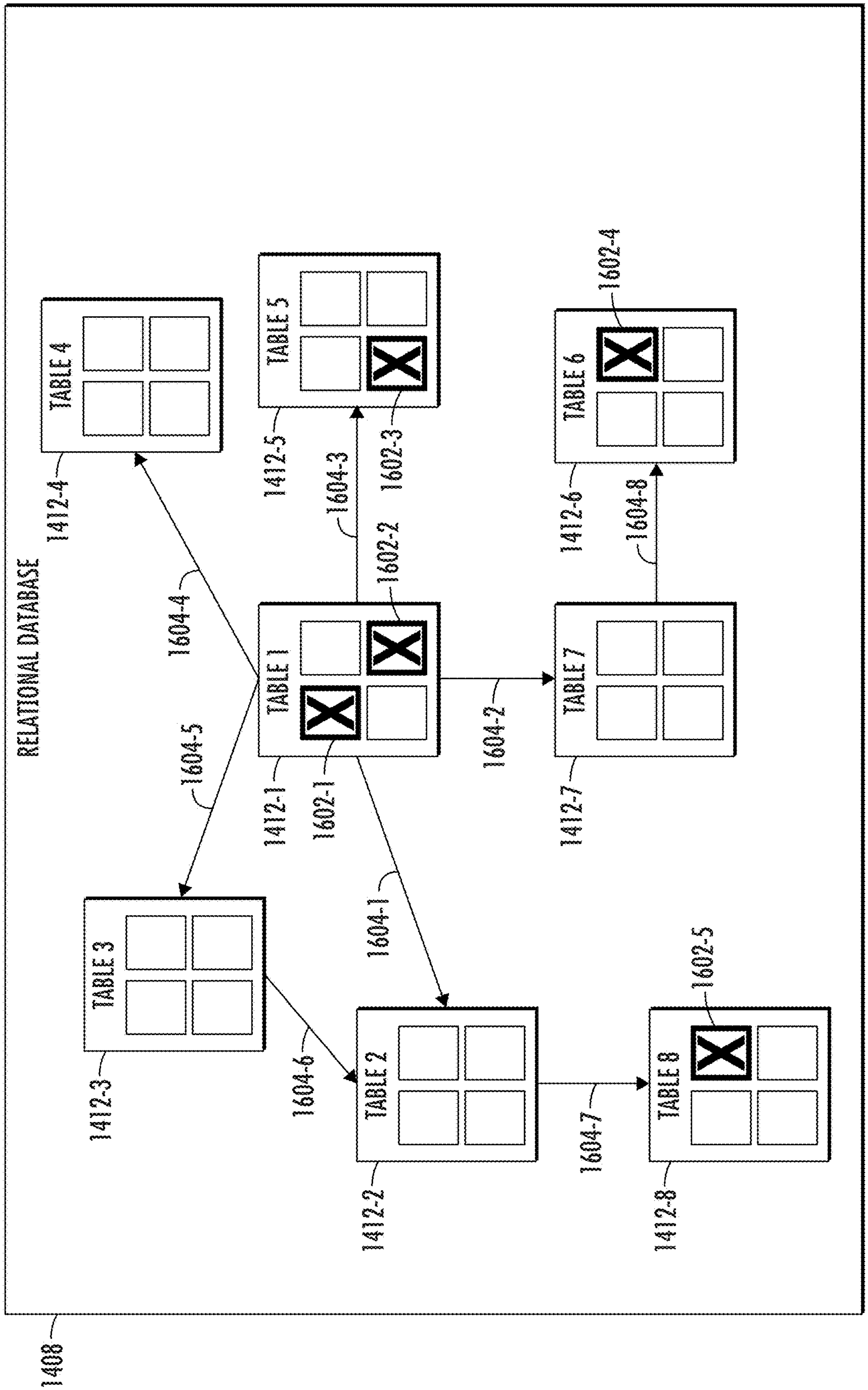
FIG. 16A is an illustration of an example relational database that includes example tables and data elements linked by a plurality of predefined join operations according to some implementations of the present disclosure.

FIG. 16A is an illustration of a relational database that includes example tables and data elements linked by a plurality of predefined join operations according to some implementations of the present disclosure. FIG. 16A will be discussed in conjunction with FIGS. 14 and 15. In particular, the relational database 1410 can include tables 1412-1-1412-8. Assume that a set of target data elements 1602-1-1602-5 (generally set of target data elements 1602) has been identified based on input information received from a user. Once the set of target data elements 1602 are identified, the target table identifier 1442 can generate the target table information 1444 to identify the "target" tables of the tables 1412 that include at least one of the set of target data elements 1602. To follow the depicted example, the tables 1412-1, 1412-5, 1412-6, and 1412-7 can be considered "target" tables that include target data elements of the set of target data elements 1602. For example, table 1412-1 includes target data elements 1602-1 and 1602-2, table 1412-5 includes target data element 1602-3, etc.

Based on the target table information 1444 and/or the input information 1420 that identifies the target data elements 1418, the join selector 1446 can select a minimum set of join operations from a plurality of predefined join operations 1604-1-1604-7 (generally, predefined join operations 1604).

Figure 16B:
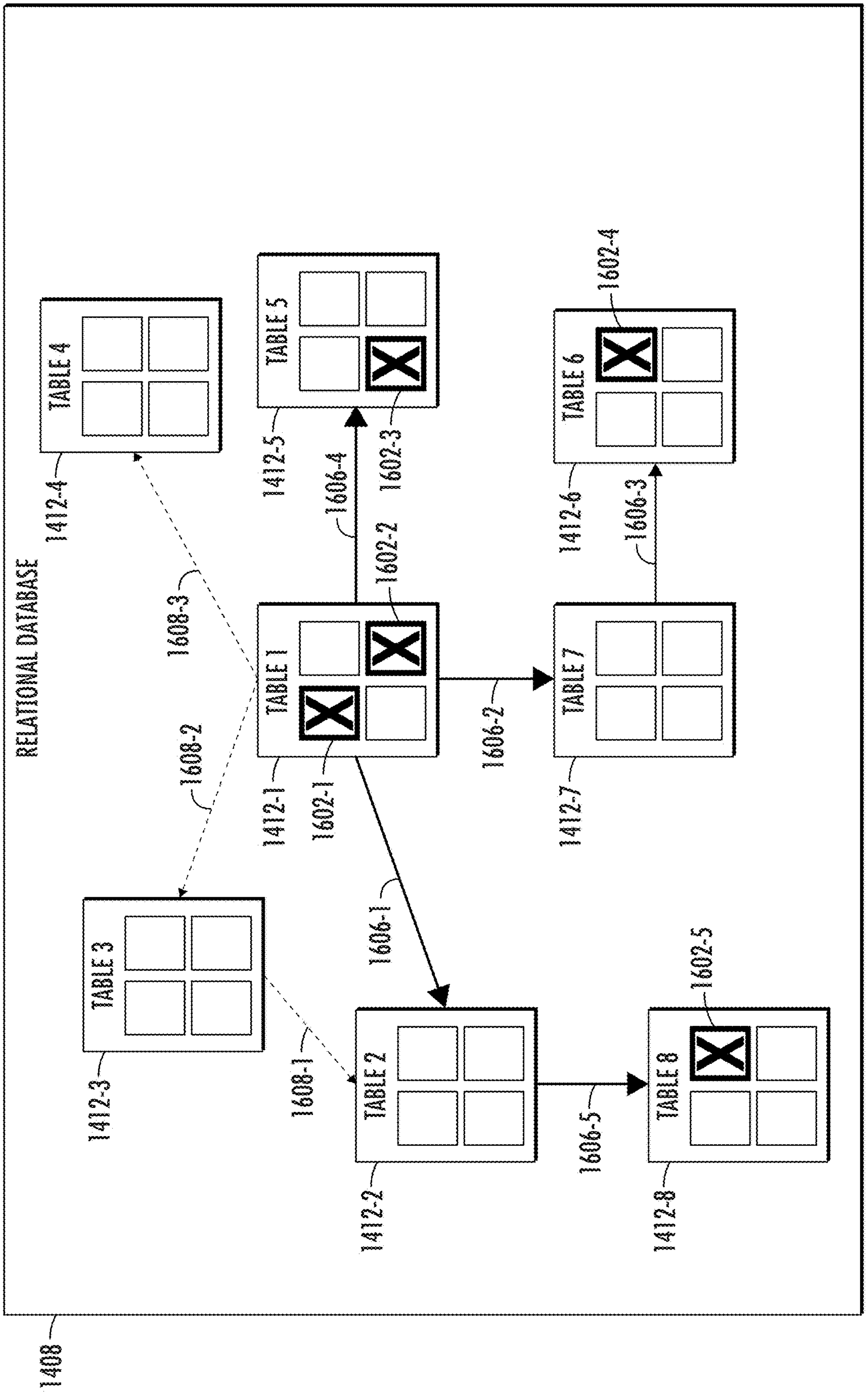
FIG. 16B is an illustration of an example minimum set of predefined join operations selected from the plurality of predefined join operations of the relational database of FIG. 16A according to some implementations of the present disclosure.

Specifically, turning to FIG. 16B, FIG. 16B is an illustration of an example minimum set of predefined join operations selected from the plurality of predefined join operations of the relational database of FIG. 16A according to some implementations of the present disclosure. More specifically, based on the target table information 1444 and/or the input information 1420 that identifies the target data elements 1418, the join selector 1446 can select a minimum set of predefined join operations 1606-1-1606-5 (generally, minimum set of predefined join operations 1606) from the plurality of predefined join operations 1604-1-1604-7 (generally, predefined join operations 1604). The minimum set of predefined join operations 1606 can include a minimum selection of predefined join operations necessary to retrieve the target data elements 1602. The predefined join operations that are not selected from the predefined join operations 1604 are referred to as non-selected join operations 1608-1-1608-3 (generally, non-selected join operations 1608).

In some implementations, the join selector 1446 can select the minimum set of predefined join operations 1606 by identifying a starting table, such as table 1412-1. The join selector 1446 can select the table 1412-1 based on various selection criteria, such as a quantity of target data elements included in the table, a number of known relationships between the table and other target tables as defined in the relational logic 1438, a size of the table 1412-1, etc. Once selected, the join selector 1446 can select a first predefined join operation, such as selected predefined join operation 1606-4, that joins a data element of the table 1412-1 to a second table that holds another of the target data elements, such as the table 1412-5. For example, if the relational logic 1438 of the mapping file 1416 indicates the existence of one direct predefined join operation between the table 1412-1 and the table 1412-5, the join selector 1446 can select that predefined join operation. If the relational logic 1438 indicates the existence of multiple predefined join operations between the table 1412-1 and the table 1412-5, the join selector 1446 can select a predefined join operation that minimizes some criteria (e.g., latency, computational complexity, size, etc.).

In some implementations, the join selector 1446 can select a join from a "target" table, such as the table 1412-1, to a "non-target" table, such as the table 1412-7. The join selector 1446 can do so when a non-target table enables access to a subsequent target table. To follow the depicted example, the relational logic 1438 of the mapping file 1416 can indicate that the table 1412-6 (e.g., a "target" table storing the target data element 1602-4) can only be retrieved via a join to table 1412-7. In this instance, although the table 1412-7 is a "non-target" table that does not include one of the target data elements 1602, the join selector 1446 may still select the selected predefined join operation 1606-2 to join the table 1412-1 to the table 1412-7, and then select the selected predefined join operation 1602-3 that joins the table 1412-7 to the table 1412-6, thus enabling retrieval of the target data element 1602-4.

The "sequence" of joins between multiple tables, such as the sequence between tables 1412-1, 1412-7, and 1412-6 described above, may also be referred to herein as a "route". In some implementations, the join selector 1446 can evaluate multiple candidate routes before selecting a "minimum" route based on the same selection criteria used to select discrete predefined join operations.

For example, assume that the mapping file 1416 includes two candidate routes from the table 1412-1 to the table 1412-8 that stores the target data element 1602-5. A first candidate route may be a sequence of join operations that includes join operations 1608-2 (from table 1412-1 to 1412-3), 1608-1 (from table 1412-3 to 1412-2), and 1606-5 (from table 1412-2 to table 1412-8). The second candidate route may be a sequence of join operations that includes 1606-1 (from table 1412-1 to 1412-2) and 1605-5 (from table 1412-2 to table 1412-8). Because the second candidate route includes fewer predefined join operations than the first candidate route, the predefined join operations that comprise the second candidate route can be selected. However, if the table 1412-3 stored a target data element, for instance, the first candidate route may be more efficient. In some implementations, such routes can be pre-defined and stored to the mapping file. Additionally, or alternatively, in some implementations, such routes can be computed dynamically by the join selector 1446.

Figure 17A:
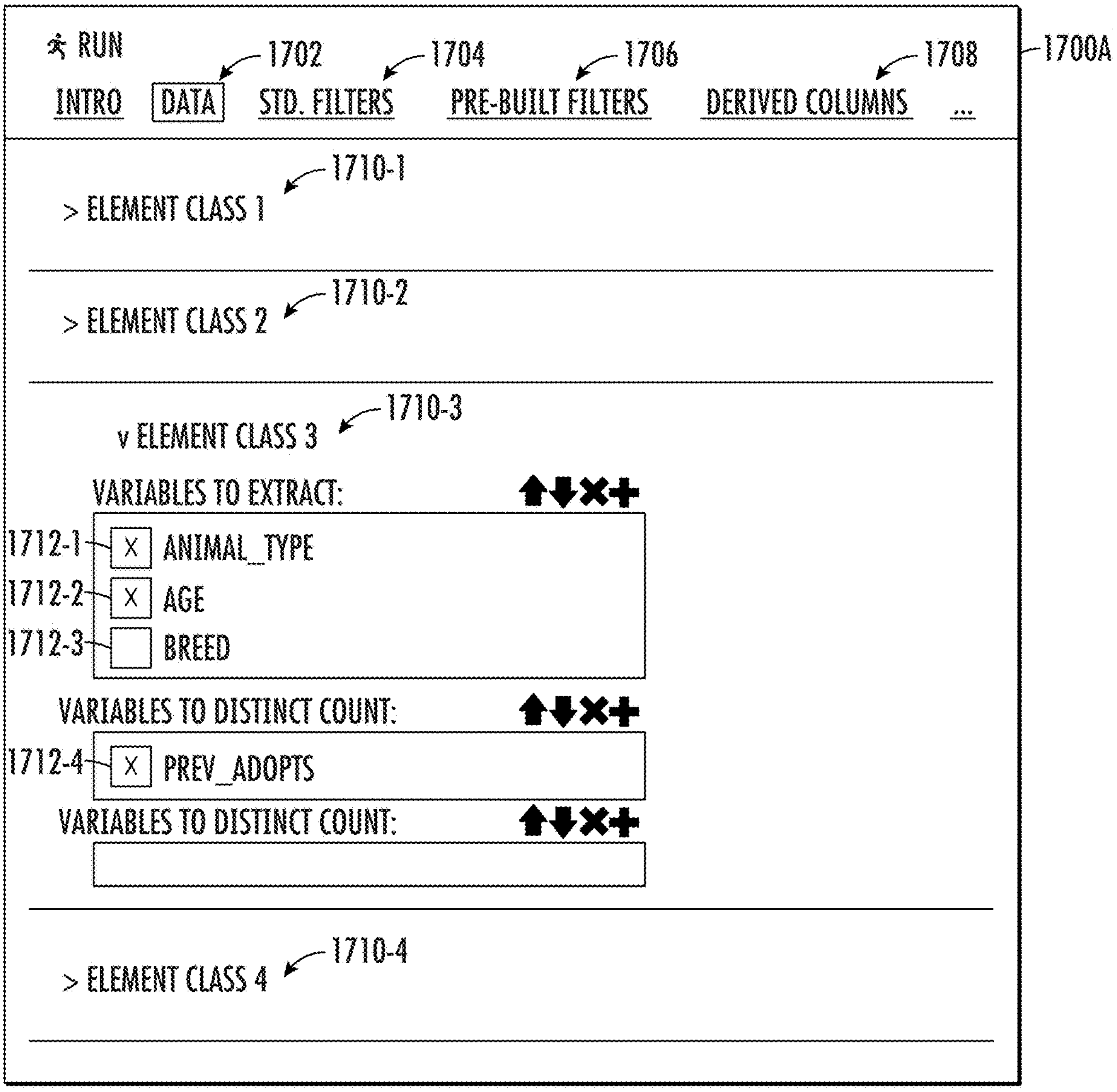
FIG. 17A illustrates an example visualization of a user interface for entering input information according to some implementations of the present disclosure.

FIG. 17A illustrates an example visualization of a user interface for entering input information according to some implementations of the present disclosure. FIG. 17A will be discussed in conjunction with FIGS. 14 and 15. User interface visualization 1700A is a visualization of the user interface 1464 presented to users of the dynamic query constructor 1408. More specifically, the user interface visualization 1700A provides a visualization of a data navigation element 1702 of a plurality of navigation elements 1702-1708 implemented within the user interface 1464. When the data navigation element 1702 is selected, element classes 1710-1-1710-N can be displayed to the user.

Element classes 1710-1-1710-N (generally, element classes 1710) can each include one or more selectable interface elements 1712-1-1712-4 (generally, selectable interface elements 1712). Each of the selectable interface elements 1712 can represent a corresponding data element of the data elements 1414. The selectable interface elements representing the data elements 1414 can be grouped within the element classes 1710 based on the element classification information 1440.

For example, assume that the relational database 1410 is a database for an animal adoption agency. The table 1412-1 may include data elements (i.e., columns) such as "ANIMAL_TYPE" and "PREV_ADOPTS" while the table 1412-2 includes data elements such as "AGE", and "BREED". Regardless of the table to which the data elements belong, the selectable interface elements 1712 that represent the data elements can be grouped within the element class 1710-3 based on a shared classification. For example, if the element class 1710-3 is a classification such as "animal information," the selectable interface elements 1712 can be selected for inclusion in the element class 1710-3 based on the element classification information 1440 classifying each data element as being associated with animal information. In this manner, implementations of the present disclosure can obscure the underlying structure of the relational database 1410 so that a user without deep knowledge of the relational database 1410 can select data elements more intuitively based on the semantic classification of the data elements.

Figure 17B:
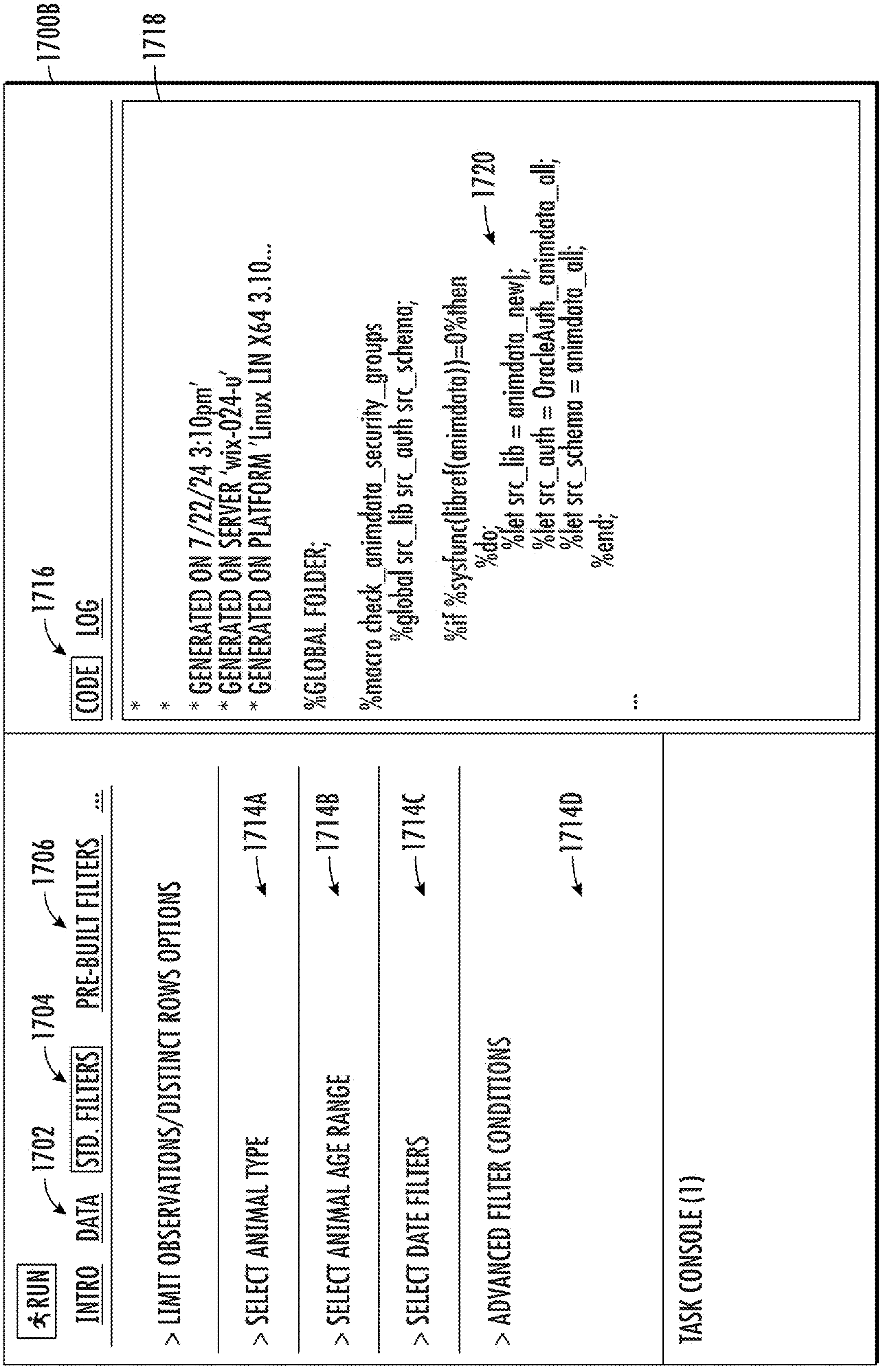
FIG. 17B illustrates an example visualization of a user interface for selecting data filters and for displaying software instructions prior to execution according to some implementations of the present disclosure.

FIG. 17B illustrates an example visualization of a user interface for selecting data filters and for displaying software instructions prior to execution according to some implementations of the present disclosure. FIG. 17B will be discussed in conjunction with FIGS. 14, 15, and 17A. User interface visualization 1700B is a visualization of the user interface 1464 presented to users of the dynamic query constructor 1408. More specifically, the user interface visualization 1700B provides the same visualization of the selectable navigation elements 1702-1708 implemented within the user interface 1464. As depicted, the user can select the standard filter navigation element 1704. When standard filter navigation element 1704 is selected, filtering options 1714A-1714-D (generally, filtering options 1714) can be displayed to the user.

In some implementations, the filtering options 1714 can be populated based on the mapping file 1416. For example, the semantic description information 1433 can include a list of possible values for the "animal type" data element. The dynamic interface constructor 1462 can dynamically create and populate the filtering option 1714A based on the list of possible values for the "animal type" data element. For another example, the semantic description information 1433 can include a range of permitted values (e.g., 0-40) for the "animal age" data element. The dynamic interface constructor 1462 can dynamically create and populate the filtering option 1714B based on the list of permitted values for the "animal age" data element.

In some implementations, the user interface 1464 can include a selectable code navigation element 1716. When selected, the dynamic interface constructor 1462 can construct an instruction viewing element 1718. The instruction viewing element 1718 can depict the unit of software instructions 1458 to the user after the user has input the input information 1420 that identifies the target data elements 1418. For example, assume that the user provides the input information 1420 that identifies the target data elements 1418. The dynamic query constructor 1408 can utilize the join selector 1446 to generate the selected join information 1448. The instruction generator 1456 can generate the unit of software instructions 1458 to implement the selected set of predefined join operations 1450 described by the selected join information 1448. The unit of software instructions 1458 can then be displayed to the user within the instruction viewing element 1718.

In some implementations, the instruction viewing element 1718 can be an interactable element that enables a user to modify the unit of software instructions 1458 prior to execution. To follow the depicted example, the user interface visualization 1700B can include a cursor visualization 1720 that represents the cursor of a user who is modifying the unit of software instructions 1458. As depicted, the user can modify "animdata" to specify a different dataset "animdata_new". In this manner, implementations described herein can enable users that do possess some knowledge of the underlying structure of the relational database 1410 to improve the efficiency or effectiveness of the unit of software instructions 1458 prior to execution.

As depicted, the unit of software instructions 1458 can include instructions written in languages other than SQL. However, it should be noted that the unit of software instructions 1458 may alternatively or additionally include SQL instructions, and such SQL instructions may also be editable via the instruction viewing element 1718.

Figure 17C:
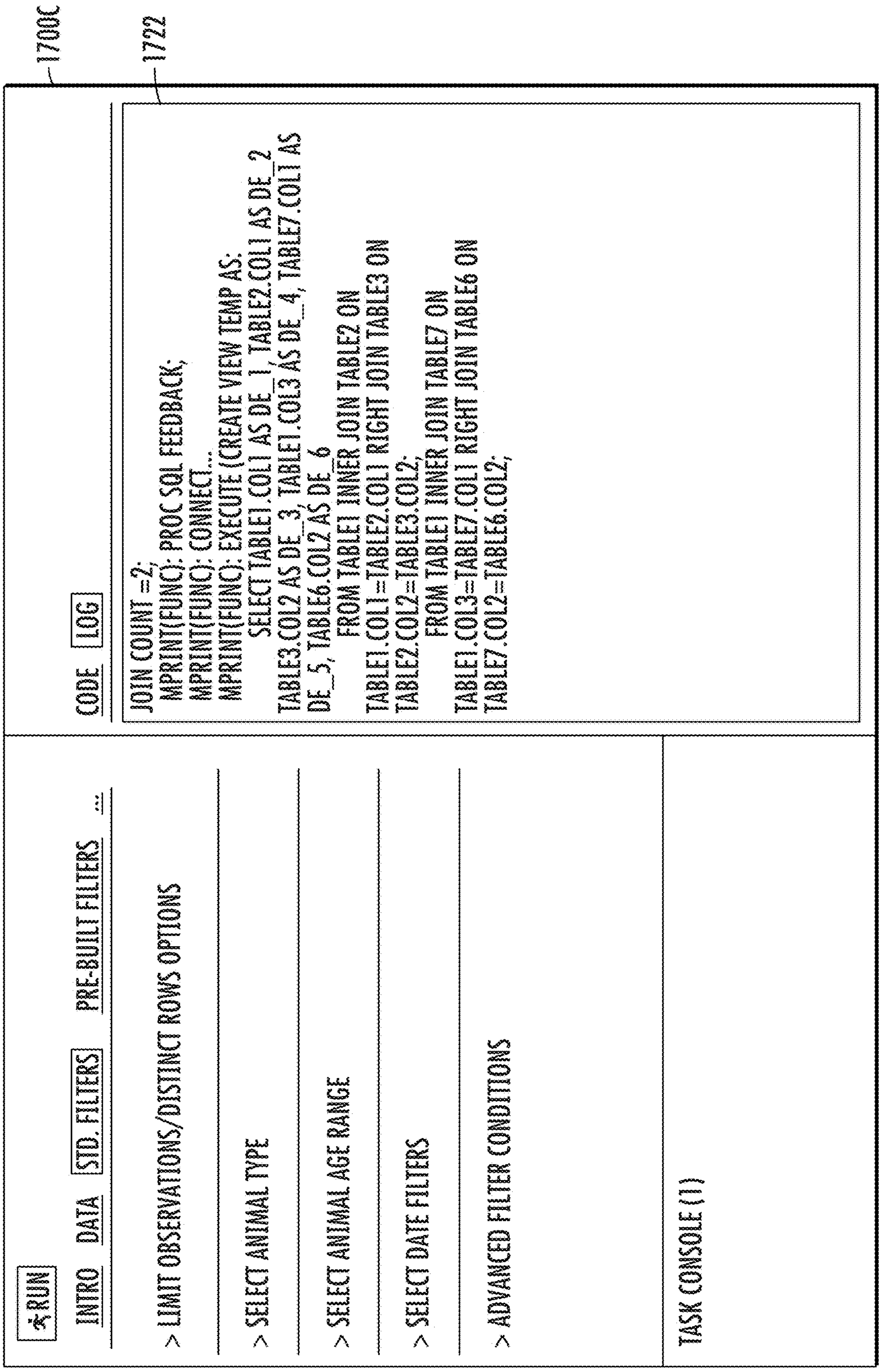
FIG. 17C illustrates an example visualization of a user interface for viewing an output resulting from execution of a unit of software instructions according to some implementations of the present disclosure.

FIG. 17C illustrates an example visualization of a user interface for viewing an output resulting from execution of a unit of software instructions according to some implementations of the present disclosure. FIG. 17C will be discussed in conjunction with FIGS. 14, 15, and 17A-17B. User interface visualization 1700C is a visualization of the user interface 1464 presented to users of the dynamic query constructor 1408. More specifically, the user interface visualization 1700C provides a visualization of an output logging element 1722 that can be dynamically constructed and/or populated as the unit of software instructions 1458 is executed. As depicted, the user can select a selectable execution element 1724. Selection of the selectable execution element 1724 can cause execution of the unit of software instructions 1458. In response, the unit of software instructions 1458 can be executed.

During execution of the unit of software instructions 1458, the output logging element 1722 can be populated with the unit of software instructions 1458, the data elements retrieved via execution of the unit of software instructions 1458, performance information associated with execution of the output logging element 1722, etc. For example, the output logging element 1722 may include performance information indicating a current runtime of the unit of software instructions 1458, an expected completion time, compute resource utilization, etc. For another example, the output logging element 1722 may include a structured data object (or a view thereof), such as a temporary view, temporary table, etc. that stores the target data elements 1418 retrieved via execution of the unit of software instructions 1458. For yet another example, the output logging element 1722 can include SQL instructions included in the unit of software instructions 1458 as they are executed.

Figure 17D:
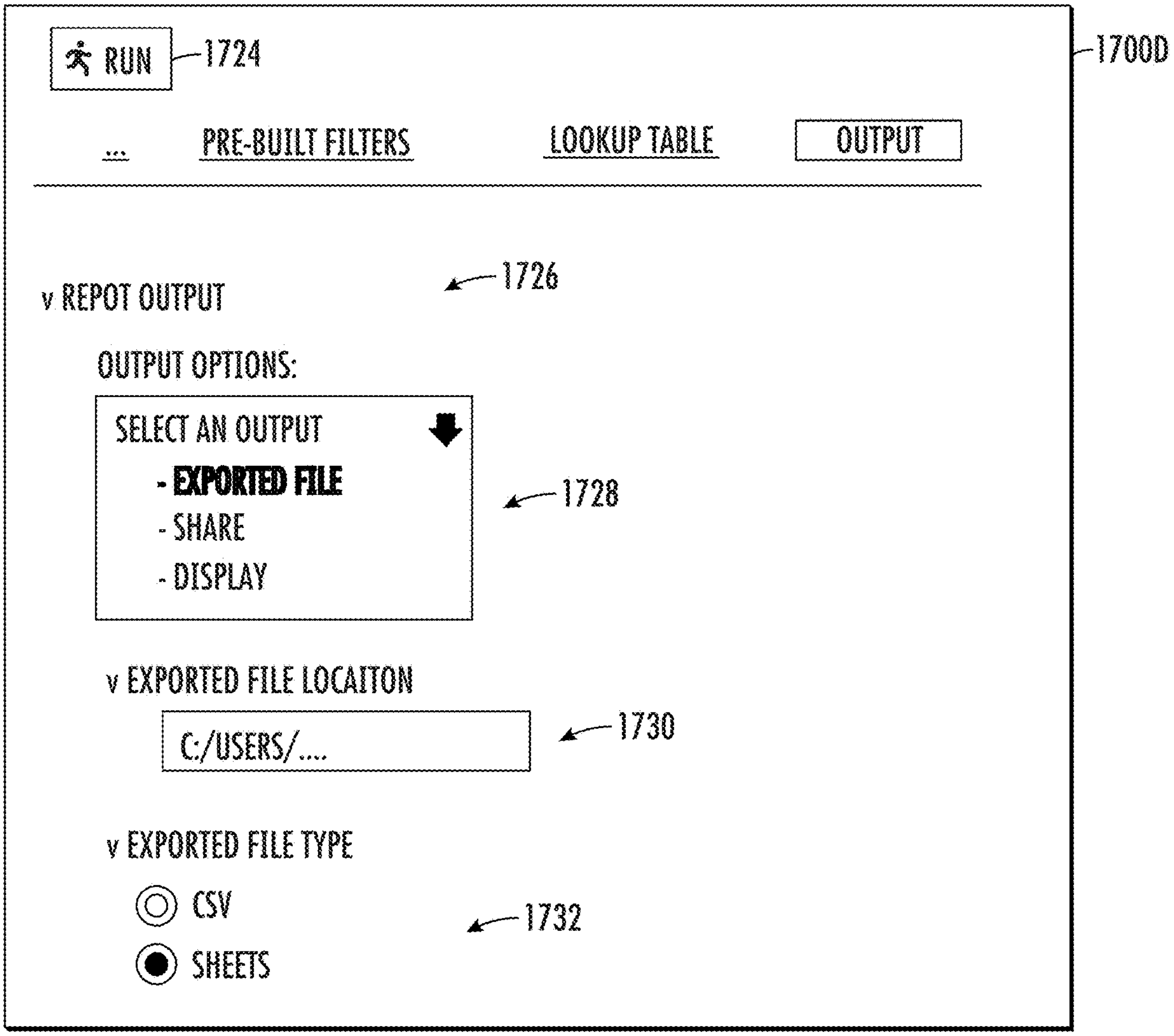
FIG. 17D illustrates an example visualization of a user interface for generating and storing an output resulting from execution of a unit of software instructions according to some implementations of the present disclosure.

FIG. 17D illustrates an example visualization of a user interface for generating and storing an output resulting from execution of a unit of software instructions according to some implementations of the present disclosure. FIG. 17D will be discussed in conjunction with FIGS. 14, 15, and 17A-17C. User interface visualization 1700D is a visualization of the user interface 1464 presented to users of the dynamic query constructor 1408. More specifically, the user interface visualization 1700C provides a visualization of a selectable execution element 1724 and an output format selection element 1726 that can be dynamically constructed and/or populated once the unit of software instructions 1458 has been executed and the target data elements 1418 have been retrieved. As depicted in the user interface visualization 1700D, the user interface 1464 can include a selectable execution element 1724. The selectable execution element 1724 can be selected by a user to cause execution of the unit of software instructions 1458.

By executing the unit of software instructions 1458, the target data elements 1418 can be retrieved. The dynamic interface constructor 1462 can then dynamically construct the output format selection element 1726 for inclusion in the user interface 1464. The output format selection element 1726 can include a number of selectable formatting options for an output of the dynamic query constructor 1408. The output can include the target data elements 1418 in a format selected by the user via the selectable formatting options. For example, the output format selection element 1726 can include an "output type" element 1728 that allows the user to select a desired type of output. If the user selects the "exported file" option, the dynamic interface constructor 1462 can further construct additional file options dependent upon selection of the "exported file" option. For example, if the "exported file" option is selected in the output type element 1728, a "file location" element 1730 can be included which allows a user to specify an internal location for the file output, a "file type" element 1732 that allows the user to specify a desired file format for the output, etc.

Figure 18:
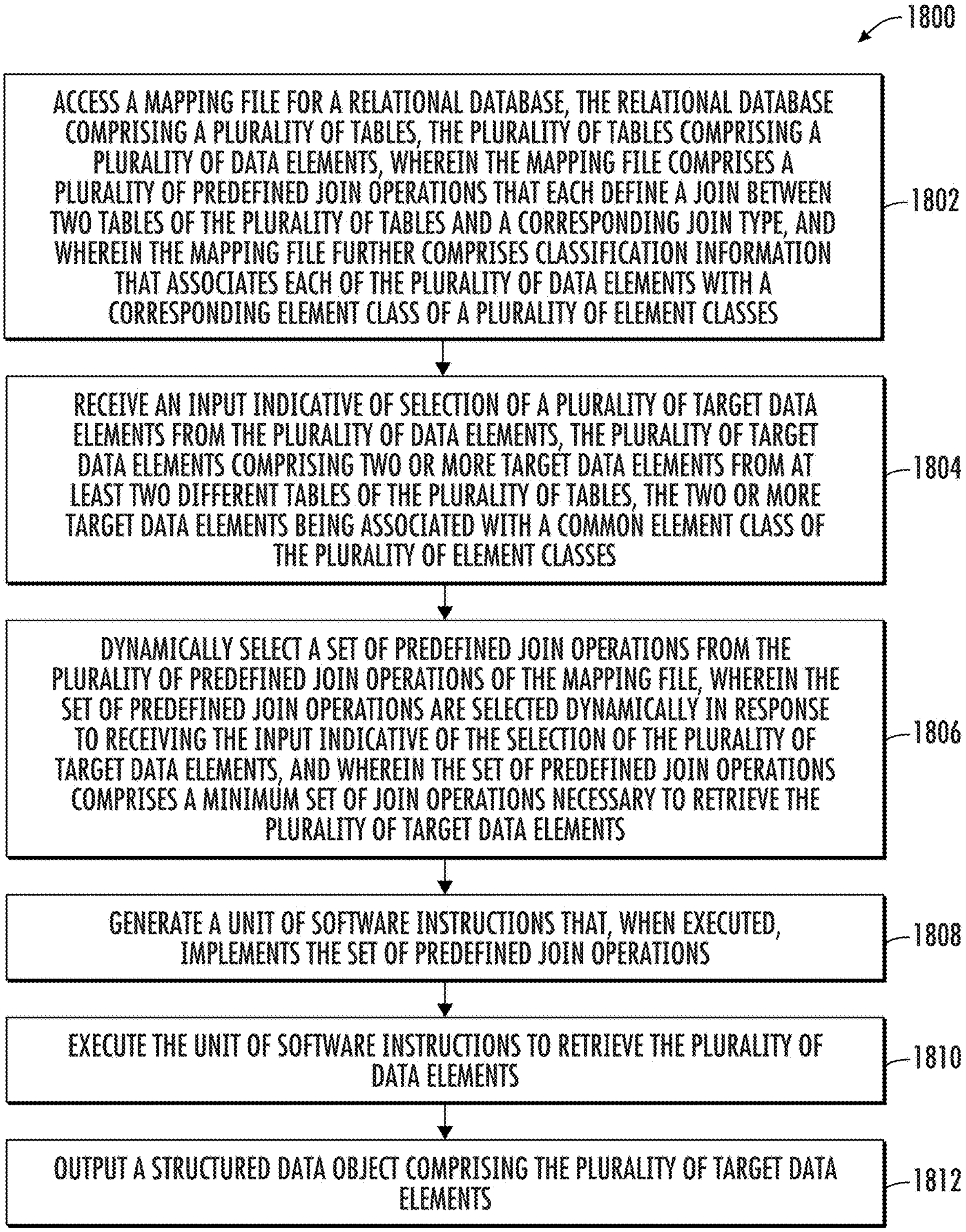
FIG. 18 is a flowchart diagram for a method for structured database mapping for dynamic SQL generation according to some implementations of the present disclosure.

FIG. 18 is a flowchart diagram for a method 1800 for structured database mapping for dynamic SQL generation according to some implementations of the present disclosure. Although FIG. 18 depicts steps performed in a particular order for purposes of illustration and discussion, the methods of the present disclosure are not limited to the particularly illustrated order or arrangement. The various operations of the method 1800 can be omitted, rearranged, combined, and/or adapted in various ways without deviating from the scope of the present disclosure.

At 1802, a computing system can access a mapping file for a relational database. The relational database can include a plurality of tables. The plurality of tables can include a plurality of data elements (e.g., a column, a set of columns, etc.). The mapping file can include a plurality of predefined join operations that each define a join between two tables of the plurality of tables and a corresponding join type. The mapping file can include classification information that associates each of the plurality of data elements with a corresponding element class of a plurality of element classes.

At 1804, the computing system can receive an input indicative of selection of a plurality of target data elements from the plurality of data elements. The plurality of target data elements can include two or more target data elements from at least two different tables of the plurality of tables. The two or more target data elements can be associated with a common element class of the plurality of element classes.

In some implementations, to receive the input indicative of selection of the plurality of target data elements, the computing system can receive a natural language input from a user via a user interface. The natural language input is descriptive of a query for the relational database. The computing system can perform a similarity search between the natural language input and a plurality of semantic descriptors respectively representing the plurality of data elements to identify a subset of data elements from the plurality of data elements. In some implementations, the computing system can identify an element of sensitive information within the query for the relational database. The computing system can replace the element of sensitive information with an element of placeholder information.

In some implementations, to perform the similarity search, the computing system can generate an intermediate representation of the query for the relational database. The computing system can perform the similarity search between the intermediate representation of the query for the relational database and a plurality of intermediate representations that respectively represent the plurality of semantic descriptors.

In some implementations, to receive the input indicative of the selection of the plurality of target data elements, the computing system can receive, via a user interface, user input information indicative of selection of the plurality of target data elements from the plurality of data elements of the plurality of tables within the relational database. The user input information is further indicative of selection of one or more pre-built filters of a plurality of pre-built filters of the mapping file.

In some implementations, to receive the input indicative of the selection of the plurality of target data elements, the computing system can dynamically construct the user interface based at least in part on the mapping file. The user interface can include a plurality of selectable interface elements. The computing system can cause display of the user interface and, responsive to causing display of the user interface, receive the user input information via the user interface.

In some implementations, to dynamically construct the user interface, the computing system can, based on the classification information of the mapping file, dynamically construct a first portion and a second portion of the user interface. The first portion of the user interface can include a first subset of the plurality of selectable interface elements that represent a corresponding first subset of target data elements of the plurality of target data elements. The first subset of target data elements is associated with a first element class of the plurality of element classes. The second portion of the user interface can include a second subset of the plurality of selectable interface elements that represent a corresponding second subset of target data elements of the plurality of target data elements. The second subset of target data elements is associated with a second element class of the plurality of element classes different than the first element class.

In some implementations, to receive the input indicative of the selection of the plurality of target data elements, the computing system can select the mapping file from a plurality of candidate mapping files based on at least one of a type of content associated with the plurality of tables within the relational database, one or more element classes associated with the plurality of target data elements of the plurality of element classes, or the plurality of target data elements.

In some implementations, to receive the user input information via the user interface, the computing system can receive additional user input information descriptive of a user-created filter via the user interface. To output the structured data object comprising the plurality of target data elements, the computing system can apply the user-created filter to the structured data object.

At 1806, the computing system can dynamically select a set of predefined join operations from the plurality of predefined join operations of the mapping file. The set of predefined join operations are selected dynamically in response to receiving the input indicative of the selection of the plurality of target data elements. The set of predefined join operations can include a minimum set of join operations necessary to retrieve the plurality of target data elements.

In some implementations, to dynamically select the set of predefined join operations, the computing system can identify a plurality of target tables from the plurality of tables, each of the plurality of target tables storing one or more of the plurality of target data elements. The computing system can select a first predefined join operation of the set of predefined join operations, wherein the first predefined join operation joins a first target table and a second target table of the plurality of target tables, wherein the first target table stores a first target data element of the plurality of target data elements, and wherein the second target table stores a second target data element of the plurality of target data elements.

In some implementations, to select the first predefined join operation of the set of predefined join operations, the computing system can select the first predefined join operation of the set of predefined join operations based on a relational logic portion of the mapping file, wherein the relational logic portion defines an existing direct relationship between the first target table and the second target table.

In some implementations, to dynamically select the set of predefined join operations from the plurality of predefined join operations of the mapping file, the computing system can select a second predefined join operation and a third predefined join operation of the set of predefined join operations. The second predefined join operation joins the first target table to a non-target table of the plurality of tables. The third predefined join operation joins the non-target table to a third target table of the plurality of target tables. The third target table stores a third target data element of the plurality of target data elements.

In some implementations, to select the second predefined join operation and the third predefined join operation of the set of predefined join operations, the computing system can obtain a first candidate route from the first target table (e.g., a pre-derived table defined by the mapping file, a materialized view table stored to the mapping file, etc.) to the third target table. The first candidate route can include the second predefined join operation and the third predefined join operation of the set of predefined join operations. The computing system can obtain a second candidate route from the first target table to the third target table different than the first candidate route. The computing system can select the first candidate route based on one or more route selection criteria. In some implementations, the first candidate route can include a pre-defined route defined by the mapping file.

At 1808, the computing system can generate a unit of software instructions that, when executed, implements the set of predefined join operations. In some implementations, to generate the unit of software instructions, the computing system can process a natural language input and a contextual input with a machine-learned LLM to generate the SQL query. The SQL query can include a subset of semantic descriptors from the plurality of semantic descriptors. Each of the subset of semantic descriptors can describe a corresponding data element of the subset of data elements. The computing system can modify the SQL query such that the SQL query implements the set of predefined join operations when the SQL query is executed.

In some implementations, to modify the SQL query such that the SQL query implements the set of predefined join operations when the SQL query is executed, the computing system can replace each of the subset of semantic descriptors within the SQL query with a corresponding data element label of a plurality of data element labels. The plurality of data element labels respectively identify the plurality of data elements within the relational database. The computing system can modify the SQL query to implement the set of predefined join operations.

In some implementations, to generate the unit of software instructions, the computing system can cause display of a preview interface element within the user interface that depicts the unit of software instructions. In some implementations, the preview interface element can include a text editor interface element configured to receive user inputs to modify the unit of software instructions.

In some implementations, to cause display of the preview interface element within the user interface, the computing system can receive modification input information obtained via the preview interface element. The modification input information is descriptive of one or more modifications to the unit of software instructions. The computing system can apply the one or more modifications to the unit of software instructions.

In some implementations, to cause display of the user interface, the computing system can cause display of a pause interface element within the user interface configured to pause execution of the unit of software instructions. The computing system can execute the unit of software instructions to retrieve the plurality of target data elements. The computing system can receive subsequent user input information obtained via the pause interface element of the user interface. The subsequent user input information is indicative of selection of the pause interface element. Responsive to the subsequent user input information, the computing system can pause execution of the unit of software instructions.

At 1810, the computing system can execute the unit of software instructions to retrieve the plurality of target data elements.

At 1812, the computing system can output a structured data object including the plurality of target data elements. In some implementations, the structured data object can be a temporary in-database view for the relational database. In some implementations, to output the structured data object comprising the plurality of target data elements, the computing system can apply the one or more pre-built filters to the structured data object.

In some implementations, the computing system can modify the mapping file to add the user-created filter to a plurality of pre-built filters of the mapping file based on an inclusion criterion. The inclusion criterion can be a number of prior occurrences in which information descriptive of the user-created filter was received via the user interface.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-program product tangibly embodied in a non-transitory machine-readable storage medium, the computer-program product including instructions operable to cause one or more processor devices to:

access a mapping file for a relational database, the relational database comprising a plurality of tables, the plurality of tables comprising a plurality of data elements, wherein the mapping file comprises a plurality of predefined join operations that each define a join between two tables of the plurality of tables and a corresponding join type of a plurality of join types, and wherein the mapping file further comprises classification information that associates each of the plurality of data elements with a corresponding element class of a plurality of element classes, each of the plurality of element classes representing a particular classification of data elements;

receive an input indicative of selection of a plurality of target data elements from the plurality of data elements, the plurality of target data elements comprising two or more target data elements from at least two different tables of the plurality of tables, wherein the classification information of the mapping file associates the two or more target data elements with a common element class of the plurality of element classes;

dynamically select a set of predefined join operations from the plurality of predefined join operations of the mapping file, wherein the set of predefined join operations are selected dynamically in response to receiving the input indicative of the selection of the plurality of target data elements, wherein the set of predefined join operations comprises one of a plurality of candidate sets of predefined join operations to retrieve the plurality of target data elements, and wherein the set of predefined join operations comprises a fewest number of predefined join operations of the plurality of candidate sets of predefined join operations;

generate a unit of software instructions that, when executed, implements the set of predefined join operations;

execute the unit of software instructions to retrieve the plurality of target data elements; and output a structured data object comprising the plurality of target data elements.

2. The computer-program product of claim 1, wherein, to dynamically select the set of predefined join operations from the plurality of predefined join operations of the mapping file, the one or more processor devices are to:

identify a plurality of target tables from the plurality of tables, each of the plurality of target tables storing one or more of the plurality of target data elements; and select a first predefined join operation of the set of predefined join operations, wherein the first predefined join operation joins a first target table and a second target table of the plurality of target tables, wherein the first target table stores a first target data element of the plurality of target data elements, and wherein the second target table stores a second target data element of the plurality of target data elements.

3. The computer-program product of claim 2, wherein, to select the first predefined join operation of the set of predefined join operations, the one or more processor devices are to:

select the first predefined join operation of the set of predefined join operations based on a relational logic portion of the mapping file, wherein the relational logic portion defines an existing direct relationship between the first target table and the second target table.

4. The computer-program product of claim 2, wherein, to dynamically select the set of predefined join operations from the plurality of predefined join operations of the mapping file, the one or more processor devices are further to:

select a second predefined join operation and a third predefined join operation of the set of predefined join operations, wherein the second predefined join operation joins the first target table to a non-target table of the plurality of tables, wherein the third predefined join operation joins the non-target table to a third target table of the plurality of target tables, and wherein the third target table stores a third target data element of the plurality of target data elements.

5. The computer-program product of claim 4, wherein, to select the second predefined join operation and the third predefined join operation of the set of predefined join operations, the one or more processor devices are to:

obtain a first candidate route from the first target table to the third target table, wherein the first candidate route comprises the second predefined join operation and the third predefined join operation of the set of predefined join operations;

obtain a second candidate route from the first target table to the third target table different than the first candidate route; and select the first candidate route based on one or more route selection criteria.

6. The computer-program product of claim 5, wherein the first candidate route comprises a pre-defined route defined by the mapping file.

7. The computer-program product of claim 5, wherein, to obtain the first candidate route, the one or more processor device are to:

compute the first candidate route based on the mapping file.

8. The computer-program product of claim 5, wherein the one or more route selection criteria comprises at least one of:

a quantity of join operations included in a route;

contents of one or more tables joined by one or more predefined joins of the set of predefined join operations selected prior to selection of the first candidate route;

an estimated computational complexity associated with the route;

a size of each table joined by the join operations included in the route; or a quantity of non-target tables joined by the join operations included in the route.

9. The computer-program product of claim 4, wherein the first target table comprises:

a pre-derived table defined by the mapping file; or a materialized view table stored to the mapping file.

10. The computer-program product of claim 1, wherein the structured data object comprises a temporary in-database view for the relational database.

11. The computer-program product of claim 1, wherein, to receive the input indicative of selection of the plurality of target data elements, the one or more processor devices are to:

receive a natural language input from a user via a user interface, wherein the natural language input is descriptive of a query for the relational database; and perform a similarity search between the natural language input and a plurality of semantic descriptors defined by the mapping file for the plurality of data elements to identify a subset of data elements from the plurality of data elements.

12. The computer-program product of claim 11, wherein, to receive the natural language input descriptive of the query for the relational database, the one or more processor devices are further to:

identify an element of sensitive information within the query for the relational database; and replace the element of sensitive information with an element of placeholder information.

13. The computer-program product of claim 11, wherein, to perform the similarity search, the one or more processor devices are to:

generate an intermediate representation of the query for the relational database; and perform the similarity search between the intermediate representation of the query for the relational database and a plurality of intermediate representations that respectively represent the plurality of semantic descriptors.

14. The computer-program product of claim 11, wherein the unit of software instructions comprises a Structured Query Language (SQL) query, and wherein, to generate the unit of software instructions, the one or more processor devices are to:

process the natural language input and a contextual input with a machine-learned Large Language Model (LLM) to generate the SQL query, the SQL query comprising a subset of semantic descriptors from the plurality of semantic descriptors, wherein each of the subset of semantic descriptors describes a corresponding data element of the subset of data elements; and modify the SQL query such that the SQL query implements the set of predefined join operations when the SQL query is executed.

15. The computer-program product of claim 14, wherein, to modify the SQL query such that the SQL query implements the set of predefined join operations when the SQL query is executed, the one or more processor devices are to:

replace each of the subset of semantic descriptors within the SQL query with a corresponding data element label of a plurality of data element labels, wherein the plurality of data element labels respectively identify the plurality of data elements within the relational database; and modify the SQL query to implement the set of predefined join operations.

16. The computer-program product of claim 1, wherein, to receive the input indicative of the selection of the plurality of target data elements, the one or more processor devices are to:

receive, via a user interface, user input information indicative of selection of the plurality of target data elements from the plurality of data elements of the plurality of tables within the relational database.

17. The computer-program product of claim 16, wherein the user input information is further indicative of selection of one or more pre-built filters of a plurality of pre-built filters of the mapping file.

18. The computer-program product of claim 17, wherein, to output the structured data object comprising the plurality of target data elements, the one or more processor devices are to:

apply the one or more pre-built filters to the structured data object.

19. The computer-program product of claim 17, wherein, to receive the input indicative of the selection of the plurality of target data elements, the one or more processor devices are further to:

select the mapping file from a plurality of candidate mapping files based on at least one of:

a type of content associated with the plurality of tables within the relational database;

one or more element classes associated with the plurality of target data elements of the plurality of element classes; or the plurality of target data elements.

20. The computer-program product of claim 17, wherein, to receive the user input information via the user interface, the one or more processor devices are further to receive additional user input information descriptive of a user-created filter via the user interface; and wherein, to output the structured data object comprising the plurality of target data elements, the one or more processor devices are to:

apply the user-created filter to the structured data object.

21. The computer-program product of claim 20, wherein the one or more processor devices are further to:

modify the mapping file to add the user-created filter to a plurality of pre-built filters of the mapping file based on an inclusion criterion.

22. The computer-program product of claim 21, wherein the inclusion criterion comprises a number of prior occurrences in which information descriptive of the user-created filter was received via the user interface.

23. A system, comprising:

one or more data processors; and a non-transitory computer-readable storage medium containing instructions which, when executed on the one or more data processors, cause the one or more data processors to:

access a mapping file for a relational database, the relational database comprising a plurality of tables, the plurality of tables comprising a plurality of data elements, wherein the mapping file comprises a plurality of predefined join operations that each define a join between two tables of the plurality of tables and a corresponding join type of a plurality of join types, and wherein the mapping file further comprises classification information that associates each of the plurality of data elements with a corresponding element class of a plurality of element classes, each of the plurality of element classes representing a particular classification of data elements;

receive an input indicative of selection of a plurality of target data elements from the plurality of data elements, the plurality of target data elements comprising two or more target data elements from at least two different tables of the plurality of tables, wherein the classification information of the mapping file associates the two or more target data elements with a common element class of the plurality of element classes;

dynamically select a set of predefined join operations from the plurality of predefined join operations of the mapping file, wherein the set of predefined join operations are selected dynamically in response to receiving the input indicative of the selection of the plurality of target data elements, wherein the set of predefined join operations comprises one of a plurality of candidate sets of predefined join operations to retrieve the plurality of target data elements, and wherein the set of predefined join operations comprises a fewest number of predefined join operations of the plurality of candidate sets of predefined join operations;

generate a unit of software instructions that, when executed, implements the set of predefined join operations;

execute the unit of software instructions to retrieve the plurality of target data elements; and output a structured data object comprising the plurality of target data elements.

24. A computer-implemented method, comprising:

accessing, by a computing system comprising one or more computing devices, a mapping file for a relational database, the relational database comprising a plurality of tables, the plurality of tables comprising a plurality of data elements, wherein the mapping file comprises a plurality of predefined join operations that each define a join between two tables of the plurality of tables and a corresponding join type of a plurality of join types, and wherein the mapping file further comprises classification information that associates each of the plurality of data elements with a corresponding element class of a plurality of element classes, each of the plurality of element classes representing a particular classification of data elements;

receiving, by the computing system, an input indicative of selection of a plurality of target data elements from the plurality of data elements, the plurality of target data elements comprising two or more target data elements from at least two different tables of the plurality of tables, wherein the classification information of the mapping file associates the two or more target data elements with a common element class of the plurality of element classes;

dynamically selecting, by the computing system, a set of predefined join operations from the plurality of predefined join operations of the mapping file, wherein the set of predefined join operations are selected dynamically in response to receiving the input indicative of the selection of the plurality of target data elements, wherein the set of predefined join operations comprises one of a plurality of candidate sets of predefined join operations to retrieve the plurality of target data elements, and wherein the set of predefined join operations comprises a fewest number of predefined join operations of the plurality of candidate sets of predefined join operations;

generating, by the computing system, a unit of software instructions that, when executed, implements the set of predefined join operations;

executing, by the computing system, the unit of software instructions to retrieve the plurality of target data elements; and outputting, by the computing system, a structured data object comprising the plurality of target data elements.

25. The computer-program product of claim 16, wherein, to receive the user input information via the user interface, the one or more processor devices are to:

dynamically construct the user interface based at least in part on the mapping file, wherein the user interface comprises a plurality of selectable interface elements;

cause display of the user interface; and responsive to causing display of the user interface, receive the user input information via the user interface.

26. The computer-program product of claim 25, wherein, to dynamically construct the user interface based at least in part on the mapping file, the one or more processor devices are to:

based on the classification information of the mapping file, dynamically construct a first portion and a second portion of the user interface, wherein:

the first portion of the user interface comprises a first subset of the plurality of selectable interface elements that represent a corresponding first subset of target data elements of the plurality of target data elements, wherein the first subset of target data elements is associated with a first element class of the plurality of element classes; and the second portion of the user interface comprises a second subset of the plurality of selectable interface elements that represent a corresponding second subset of target data elements of the plurality of target data elements, wherein the second subset of target data elements is associated with a second element class of the plurality of element classes different than the first element class.

27. The computer-program product of claim 26, wherein, to generate the unit of software instructions that, when executed, implements the set of predefined join operations, the one or more processor devices are further to:

cause display of a preview interface element within the user interface that depicts the unit of software instructions.

28. The computer-program product of claim 27, wherein the preview interface element comprises a text editor interface element configured to receive user inputs to modify the unit of software instructions.

29. The computer-program product of claim 28, wherein, to cause display of the preview interface element within the user interface, the one or more processor devices are further to:

receive modification input information obtained via the preview interface element, wherein the modification input information is descriptive of one or more modifications to the unit of software instructions; and wherein, to execute the unit of software instructions to retrieve the plurality of target data elements, the one or more processor devices are to:

apply the one or more modifications to the unit of software instructions.

30. The computer-program product of claim 25, wherein, to cause display of the user interface, the one or more processor devices are further to:

cause display of a pause interface element within the user interface configured to pause execution of the unit of software instructions; and wherein, to execute the unit of software instructions to retrieve the plurality of target data elements, the one or more processor devices are to:

execute the unit of software instructions to retrieve the plurality of target data elements;

receive subsequent user input information obtained via the pause interface element of the user interface, wherein the subsequent user input information is indicative of selection of the pause interface element; and responsive to the subsequent user input information, pause execution of the unit of software instructions.

31. The computer-program product of claim 1, wherein the mapping file comprises a pre-derived table that stores results of a prior query, wherein the set of predefined join operations comprises a first predefined join operation that joins the pre-derived table to one of the at least two different tables of the plurality of tables.

32. The computer-program product of claim 1, wherein the mapping file comprises semantic description information that describes contents of at least some of the plurality of tables of the relational database.

* * * * *